(12) United States Patent
Yokota et al.

(10) Patent No.: US 8,332,649 B2
(45) Date of Patent: Dec. 11, 2012

(54) AUTHENTICATION SYSTEM, SIGNATURE CREATING DEVICE, AND SIGNATURE VERIFYING DEVICE

(75) Inventors: Kaoru Yokota, Hyogo (JP); Natsume Matsuzaki, Osaka (JP); Masao Nonaka, Osaka (JP)

(73) Assignee: Panasonic Corporation, Osaka (JP)

( * ) Notice: Subject to any disclaimer, the term of this patent is extended or adjusted under 35 U.S.C. 154(b) by 1237 days.

(21) Appl. No.: 12/092,785

(22) PCT Filed: Oct. 26, 2006

(86) PCT No.: PCT/JP2006/321356
§ 371 (c)(1),
(2), (4) Date: May 6, 2008

(87) PCT Pub. No.: WO2007/055104
PCT Pub. Date: May 18, 2007

(65) Prior Publication Data
US 2009/0193250 A1    Jul. 30, 2009

(30) Foreign Application Priority Data
Nov. 8, 2005   (JP) ................................. 2005-323206

(51) Int. Cl.
*H04L 9/32* (2006.01)
(52) U.S. Cl. ........ 713/180; 713/156; 713/175; 713/176; 726/2; 726/3; 726/4
(58) Field of Classification Search .................. 713/168, 713/17, 156, 175–176, 180; 726/2–4
See application file for complete search history.

(56) References Cited

U.S. PATENT DOCUMENTS

| 7,526,651 B2 * | 4/2009 | Arditti Modiano et al. .. 713/180 |
| 2002/0116610 A1 * | 8/2002 | Holmes et al. ................. 713/156 |
| 2003/0084294 A1 * | 5/2003 | Aoshima et al. .............. 713/169 |
| 2003/0233542 A1 * | 12/2003 | Benaloh ........................ 713/156 |
| 2004/0123110 A1 * | 6/2004 | Zhang et al. .................. 713/176 |
| 2004/0153652 A1 * | 8/2004 | Suga ............................. 713/176 |

(Continued)

FOREIGN PATENT DOCUMENTS
JP           2003-345752      12/2003
(Continued)

OTHER PUBLICATIONS

International Search Report mailed Dec. 26, 2006 in the International Application No. PCT/JP2006/321356 of which the present application is the U.S. National Stage.

(Continued)

*Primary Examiner* — Yin-Chen Shaw
(74) *Attorney, Agent, or Firm* — Wenderoth, Lind & Ponack, L.L.P.

(57) ABSTRACT

A signature generating device generating digital signature data for certifying authenticity of information of a person, and obfuscating the information. The signature generating device includes a storage unit storing attribute information concerning the person and a private key corresponding to the attribute information, an obfuscated information generating unit selecting one or more pieces of dummy information in relation to the attribute information, and generating the obfuscated information including the attribute information and the dummy information; and a public key obtaining unit obtaining a public key corresponding to the attribute information and public keys respectively corresponding to the dummy information. The signature generating device also includes a signature generating unit generating digital signature data by performing a ring signature generation process to the obfuscated information, using the private key and the public key corresponding to the attribute information and using the public keys corresponding to dummy information.

1 Claim, 23 Drawing Sheets

U.S. PATENT DOCUMENTS

| | | | |
|---|---|---|---|
| 2004/0260926 A1* | 12/2004 | Arditti Modiano et al. | 713/170 |
| 2005/0022102 A1* | 1/2005 | Gentry | 715/500 |
| 2006/0253704 A1* | 11/2006 | Kempf et al. | 713/158 |
| 2008/0091941 A1* | 4/2008 | Yonezawa et al. | 713/158 |
| 2009/0024852 A1* | 1/2009 | Yonezawa et al. | 713/180 |

FOREIGN PATENT DOCUMENTS

| | | |
|---|---|---|
| JP | 2004-289247 | 10/2004 |

OTHER PUBLICATIONS

ITU-T, "Information Technology—Open Systems Interconnection—The Directory: Public-key and Attribute Certificate Frameworks", Recommendation X. 509, Mar. 2000, pp. 53-77.

\* cited by examiner

| 0 | "Age 0" obfuscation public key | (e_0, n_0) |
|---|---|---|
| 1 | "Age 1" obfuscation public key | (e_1, n_1) |
| 2 | "Age 2" obfuscation public key | (e_2, n_2) |
| ⋮ | ⋮ | ⋮ |
| 23 | "Age 23" obfuscation public key | (e_23, n_23) |
| 24 | "Age 24" obfuscation public key | (e_24, n_24) |
| ⋮ | ⋮ | ⋮ |
| 99 | "Age 99" obfuscation public key | (e_99, n_99) |

300

AUTHENTICATION SYSTEM, SIGNATURE CREATING DEVICE, AND SIGNATURE VERIFYING DEVICE

TECHNICAL FIELD

The present invention relates to certificate data such as an identification certificate authenticated by a third party, and specifically relates to an authentication system for performing an accurate identification authentication while assuring the privacy of the certificate holder.

BACKGROUND ART

In a digital content distribution service that is provided via a network, the service supplier manages the clients by, for example, requesting the user to present his/her age to judge whether or not the content to be provided is appropriate for his/her age, or requesting the user to present the address of his/her residence.

On the other hand, the user, who is requested to present his/her age or address, has a desire to present only minimum personal information. The below-identified Non-Patent Document 1 discloses a technology for satisfying the desire.

According to the technology, an attribute certificate issuance server that manages the personal information such as the name, address, and age of users, as well as public keys assigned to the users, issues an attribute certificate containing as many information as requested by the user. For example, when the user wants to certify only his/her age, the user requests the server to issue an age certificate. Upon receiving the request to issue the age certificate, the server issues attribute certificate data that is generated by applying a digital signature to combined data of a public key and age of the user. The certificate assures that the user is of the age contained in the certificate when the user has a private key corresponding to the public key contained in the certificate. In this example case, the attribute certificate discloses the age of the user, but does not disclose the other information such as the name and address. That is to say, the user can disclose only necessary personal information.

Patent Document 1: Japanese Patent Application Publication No. 2004-289247

Non-Patent Document 1: ITU-T, "Information Technology—Open systems interconnection—The directory: Public-key and attribute certificate frameworks", Recommendation X. 509, March 2000

DISCLOSURE OF THE INVENTION

The Problems the Invention is Going to Solve

However, the conventional technologies have the following problems. Namely, when the content supplier requests the user to present the identification certificate for use in a judgment on whether the user satisfies a predetermined condition, and the user has to use the attribute certificate of the conventional technology as the identification certificate, the user must disclose more personal information than necessary, exceeding the extent of the minimum information required for the judgment, such as the actual age or address of the user.

The object of the present invention is therefore to provide an authentication system, a signature generating device, and a signature verifying device that discloses only minimum personal information and confirms the authenticity of the personal information.

Means to Solve the Problems

The above-described object is fulfilled by a signature generating device for generating digital signature data that certifies authenticity of information of a person, and making the information obfuscated, the signature generating device comprising: a storage unit storing attribute information concerning the person and a private key corresponding to the attribute information; an obfuscated information generating unit operable to select one or more pieces of dummy information in relation to the attribute information, and generate the obfuscated information that includes the attribute information and the one or more pieces of dummy information; a public key obtaining unit operable to obtain a public key corresponding to the attribute information and one or more public keys respectively corresponding to the one or more pieces of dummy information; and a signature generating unit operable to generate digital signature data by performing a ring signature generation process to the obfuscated information, using (i) the private key corresponding to the attribute information, (ii) the public key corresponding to the attribute information, and (iii) the one or more public keys respectively corresponding to the one or more pieces of dummy information.

Effects of the Invention

With the stated structure, the signature generating device generates the obfuscated information by attaching the selected pieces of dummy information to the attribute information, and thus can obfuscate the attribute information. Also, since the ring signature is used as the digital signature, the verifier side can confirm that the digital signature was generated by using a private key that corresponds to any one of the attribute information and the one or more pieces of dummy information, but cannot recognize specifically which private key was actually used for generating the signature.

In the above-described signature generating device, the one or more pieces of dummy information selected by the obfuscated information generating unit may indicate an attribute that is indicated by the attribute information.

With the stated structure, it is possible to obfuscate the attribute information using dummy information having the same attribute as the attribute information.

In the above-described signature generating device, the attribute may be age, the attribute information indicates an age of the person, and the one or more pieces of dummy information selected by the obfuscated information generating unit indicate ages that are different from the age indicated by the attribute information.

With the stated structure, when the user is required to present the age, the user can present the obfuscated information where the age has been obfuscated.

In the above-described signature generating device, the attribute may be address, the attribute information indicates a name of a region in which the person resides, and the one or more pieces of dummy information selected by the obfuscated information generating unit indicate region names that are different from the region name indicated by the attribute information.

With the stated structure, when the user is required to present the region name such as a "todofuken" name, the user can present the obfuscated information where the region name has been obfuscated.

In the above-described signature generating device, the attribute may be nationality, the attribute information indicates a nation name as a nationality of the person, and the one or more pieces of dummy information selected by the obfuscated information generating unit indicate nation names that are different from the nation name indicated by the attribute information.

With the stated structure, when the user is required to present the nationality, the user can present the obfuscated information where the nationality has been obfuscated.

The above-described signature generating device may further comprise an obfuscation instruction receiving unit operable to receive an obfuscation instruction indicating a selection condition being a condition for selecting dummy information, and the one or more pieces of dummy information selected by the obfuscated information generating unit satisfy the selection condition.

With the stated structure, the signature generating device can receive a selection condition and perform the obfuscation process as desired by the person.

In the above-described signature generating device, the selection condition received by the obfuscation instruction receiving unit may indicate the number of pieces of dummy information to be selected, and the obfuscated information generating unit selects as many pieces of dummy information as the number of pieces indicated by the selection condition.

With the stated structure, it is possible to obfuscate the attribute information to a greater degree by increasing the number of pieces of dummy information that are added to the attribute information.

The above-described signature generating device may be a device for using a service supplied by a service supply device, and may further comprise: a request generating unit operable to generate a service request that contains the obfuscated information and the digital signature data; a request transmitting unit operable to transmit the service request to the service supply device; and a service receiving unit operable to receive the service from the service supply device.

With the stated structure, when the person is authenticated by the service supply device and receives a service therefrom, the person transmits the obfuscated information. This means that the person can present obfuscated personal information, compared with the case where the person transmits only the attribute information. Also, by transmitting the digital signature, it is possible to certify to the service supply device that the information contained in the obfuscated information is authentic.

The above-described signature generating device may further comprise: an obtaining unit operable to obtain, from an external authentication device, the attribute information, the private key, and digital signature data for the attribute information and the private key; a signature verifying unit operable to verify the obtained digital signature data; and a writing unit operable to write the attribute information and the private key into the storage unit when a result of the verification by the signature verifying unit is success.

With the stated structure, the signature generating device can generate the obfuscated information based on the attribute information that has been authenticated by the authentication device.

The above-describe object of the present invention can also be fulfilled by a signature verifying device for verifying the digital signature data generated by the above-described signature generating device, the signature verifying device comprising: a public key obtaining unit operable to obtain the public key corresponding to the attribute information and the one or more public keys respectively corresponding to the one or more pieces of dummy information; and a signature verifying unit operable to perform a ring signature verification process onto the digital signature data using the obtained public keys.

With the stated structure, the signature verifying device, by the nature of the ring signature, can verify that any piece of attribute information contained in the obfuscated information is authentic attribute information of the person, but cannot determine which piece of attribute information is the authentic one.

The above-described signature verifying device may be a device for supplying a service to a service use device, and may further comprise: a request receiving unit operable to receive, from the service use device, a service request that contains the digital signature data and the obfuscated information being information concerning a user of the service use device; a judging unit operable to judge, based on the obfuscated information, whether or not to supply the service to the user; and a service supplying unit operable to supply the service to the service use device when a result of the ring signature verification process by the signature verifying unit is success and the judging unit judges to supply the service.

With the stated structure, the service supply device can supply the service to the service use device after verifying the ring signature and judging whether to supply the service. With this structure, for example, when the content supplier needs to confirm that the user is of a predetermined age or more but does not need to confirm the actual age of the user, a minimum confirmation (for example, a confirmation that the age of the user is not less than 18) can be obtained even if the actual age of the user is not disclosed.

It should be noted here that the storage unit of the signature generating device corresponds to the identification authentication information storage unit 205 of the service use device 20 described later in the embodiment, the obfuscated information generating unit corresponds to the identification information converting unit 222 of the obfuscated identification authentication information generating unit 209, the public key obtaining unit corresponds to the obfuscation public key obtaining unit 208, and the signature generating unit corresponds to the ring signature generating unit 223 of the obfuscated identification authentication information generating unit 209.

It should be noted further that the obfuscation instruction receiving unit of the signature generating device corresponds to the obfuscation instruction receiving unit 207 of the service use device 20, the request generating unit and the request transmitting unit correspond to the service use request transmitting unit 210, and the service receiving unit corresponds to the content receiving unit 211.

It should be noted further that the obtaining unit of the signature generating device corresponds to the identification authentication information receiving unit 203 of the service use device 20, and the signature verifying unit and the writing unit correspond to the signature verifying unit 204.

It should be noted further that the public key obtaining unit of the signature verifying device corresponds to the authentication public key obtaining unit 402 of the service supply device 1 (40) that will be described later in the embodiment, and the signature verifying unit corresponds to the ring signature verifying unit 403.

It should be noted further that the request receiving unit of the signature verifying device corresponds to the data dividing unit 401, the judging unit corresponds to the user identification information confirming unit 404, and the service supplying unit corresponds to the service data transmission control unit 406 and the content transmitting unit 408.

DESCRIPTION OF CHARACTERS

Figure 1:
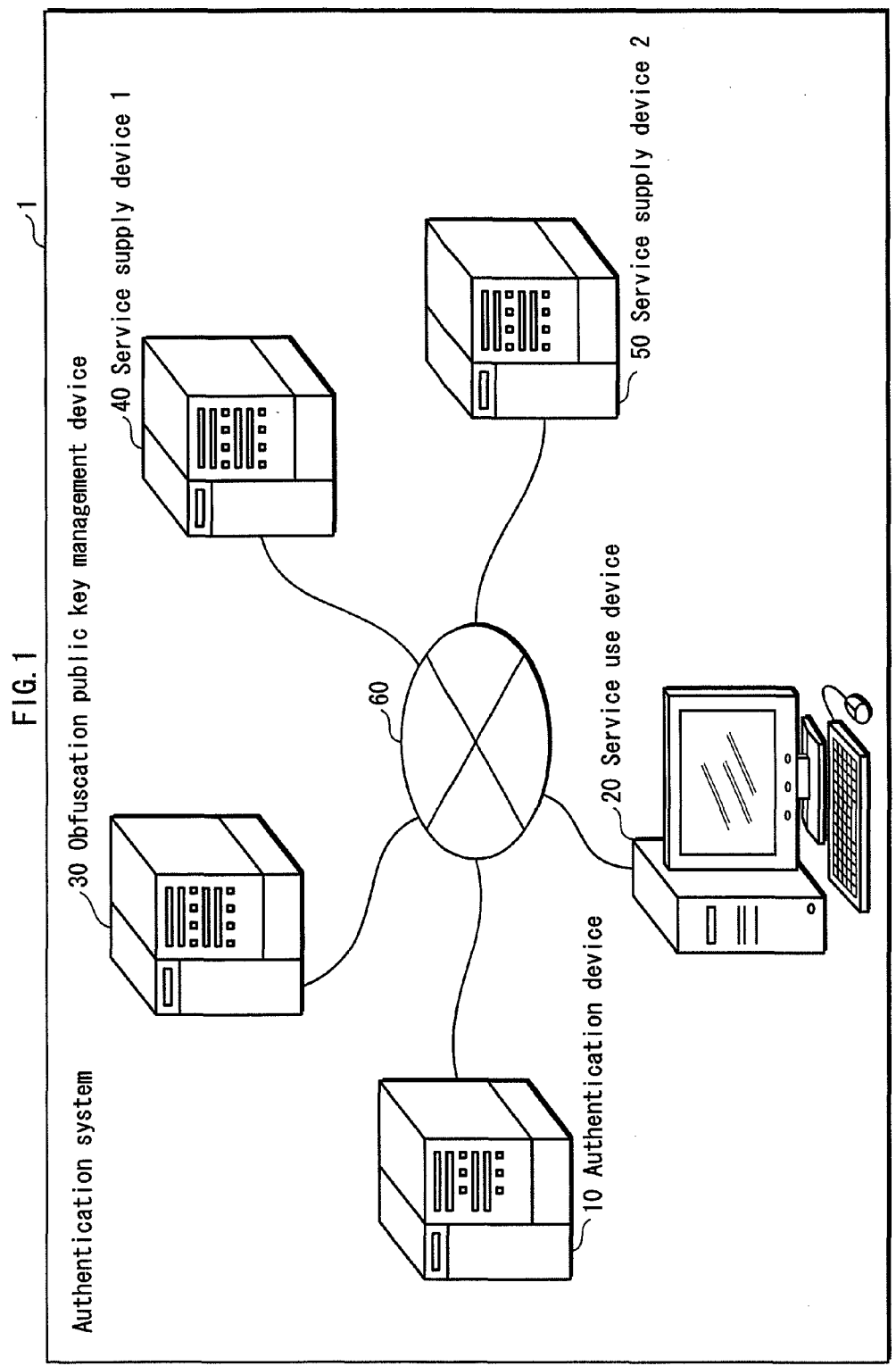
FIG. 1 shows the system structure of the authentication system 1.

1 authentication system
10 authentication device
20 service use device
30 obfuscation public key management device
40 service supply device 1
50 service supply device 2
60 network
101 signature key generating unit
102 obfuscation public key generating unit
103 identification authentication information issuance request data receiving unit
104 user identification information confirming unit
105 identification authentication private key holding unit
106 identification authentication information generating unit
107 identification authentication information transmitting unit
151 data dividing unit
152 identification authentication private key obtaining unit
153 identification authentication private key attaching unit
154 signature generating unit
201 user identification information storage unit
202 identification authentication information issuance request data transmitting unit
203 identification authentication information receiving unit
204 signature verifying unit
205 identification authentication information storage unit
206 identification authentication information display unit
207 obfuscation instruction receiving unit
208 obfuscation public key obtaining unit
209 obfuscated identification authentication information generating unit
210 service use request transmitting unit
211 content receiving unit
212 content playback unit
221 data dividing unit
222 identification information converting unit
223 ring signature generating unit
224 data concatenating unit
401 data dividing unit
402 authentication public key obtaining unit
403 ring signature verifying unit
404 user identification information confirming unit
405 user registration unit
406 service data transmission control unit
407 content storage unit
408 content transmitting unit

BEST MODE FOR CARRYING OUT THE INVENTION

The following describes an authentication system 1 as an embodiment of the present invention, with reference to the attached drawings.

<Overview>

FIG. 1 is a system structure diagram showing the structure of the authentication system 1.

As shown in FIG. 1, the authentication system 1 includes an authentication device 10, a service use device 20, an obfuscation public key management device 30, a service supply device 1 (40), and a service supply device 2 (50). These devices are connected to each other via a network 60.

The authentication system 1 allows a user to use a service of a content distribution where a content is distributed from the service supply device 1 (40) or the service supply device 2 (50) via the network 60.

Each time upon receiving a content request from the service use device 20, the service supply device 1 (40) or the service supply device 2 (50) requests the service use device 20 to present the identification information of the user. The service use device 20, when the authentication system 1 is booted, obtains identification authentication information from the authentication device 10 held by the CA (Certificate Authority). The service use device 20 presents the identification authentication information in response to the identification information presentation request received from each service supply device. In the present embodiment, the identification information of the user is composed of three attributes: "age", "nationality", and "address". Among these, the "address" is represented by the name of "todofuken" in which the user resides. It should be noted here that the term "todofuken" indicates the largest administrative regions (metropolis and prefectures) of Japan.

In the present embodiment, the service supply device 1 (40) requests the user to present his/her "age", and the service supply device 2 (50) requests the user to present his/her "age", "nationality", and "address".

When presenting the identification information requested from each service supply device, the service use device 20 subjects the requested identification information to an "obfuscation process", and presents the identification information having been subjected to the obfuscation process, to each service supply device.

The obfuscation process is a process for converting certain information into information having a range. For example, the obfuscation process converts identification information "age=age 25" into "age=age 20 to age 25". For performing the obfuscation process, the service use device 20 obtains an obfuscation public key from the obfuscation public key management device 30.

The devices constituting the authentication system 1 determine a hash algorithm and a private key encryption algorithm that are used commonly in the system, and publicize the determined algorithms in the system. One example of the private key encryption algorithm is DES (Data Encryption Standard).

<Structure>

Here will be described the structure of each device constituting the authentication system 1.

1. Authentication Device 10

Figure 2:
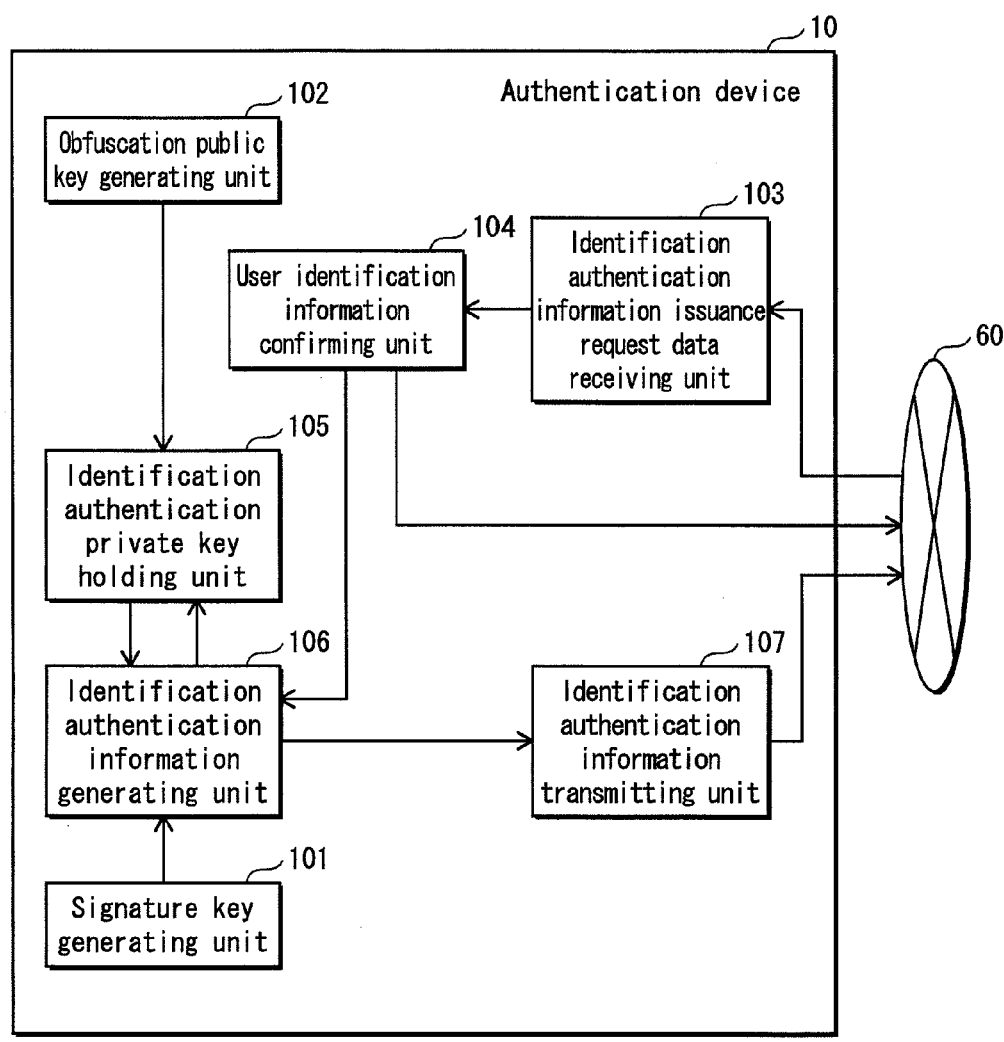
FIG. 2 is a functional block diagram functionally showing the structure of the authentication device 10.

FIG. 2 is a functional block diagram functionally showing the structure of the authentication device 10. As shown in FIG. 2, the authentication device 10 includes a signature key generating unit 101, an obfuscation public key generating unit 102, an identification authentication information issuance request data receiving unit 103, a user identification information confirming unit 104, an identification authentication private key holding unit 105, an identification authentication information generating unit 106, and an identification authentication information transmitting unit 107.

The authentication device 10 is specifically a computer system that includes a microprocessor, ROM, RAM, a hard disk unit, a network connection unit and the like. A computer program is stored in the RAM or the hard disk unit. The microprocessor operates in accordance with the computer program and causes the authentication device 10 to achieve its functions.

(1) Signature Key Generating Unit 101

The signature key generating unit 101, when the authentication system 1 is booted, generates a signature generation key and a signature verification key for a digital signature. The signature key generating unit 101 outputs the generated signature generation key to the identification authentication information generating unit 106, and notifies the generated signature verification key to the service use device 20. The signature key generating unit 101 may transmit the generated signature verification key via the network 60, or notify it by any other method.

(2) Obfuscation Public Key Generating Unit 102

The obfuscation public key generating unit 102, when the authentication system 1 is booted, generates an age authentication private key database 110, a nationality authentication private key database 120, an address authentication private key database 130, an age obfuscation public key database 300, a nationality obfuscation public key database, and an address obfuscation public key database.

The obfuscation public key generating unit 102 outputs each of the generated private key databases to the identification authentication private key holding unit 105, and distributes each of the generated obfuscation public key databases to the obfuscation public key management device 30. The obfuscation public key generating unit 102 may transmit each of the generated obfuscation public key databases via the network 60, or distribute it by any other method.

Figure 3:
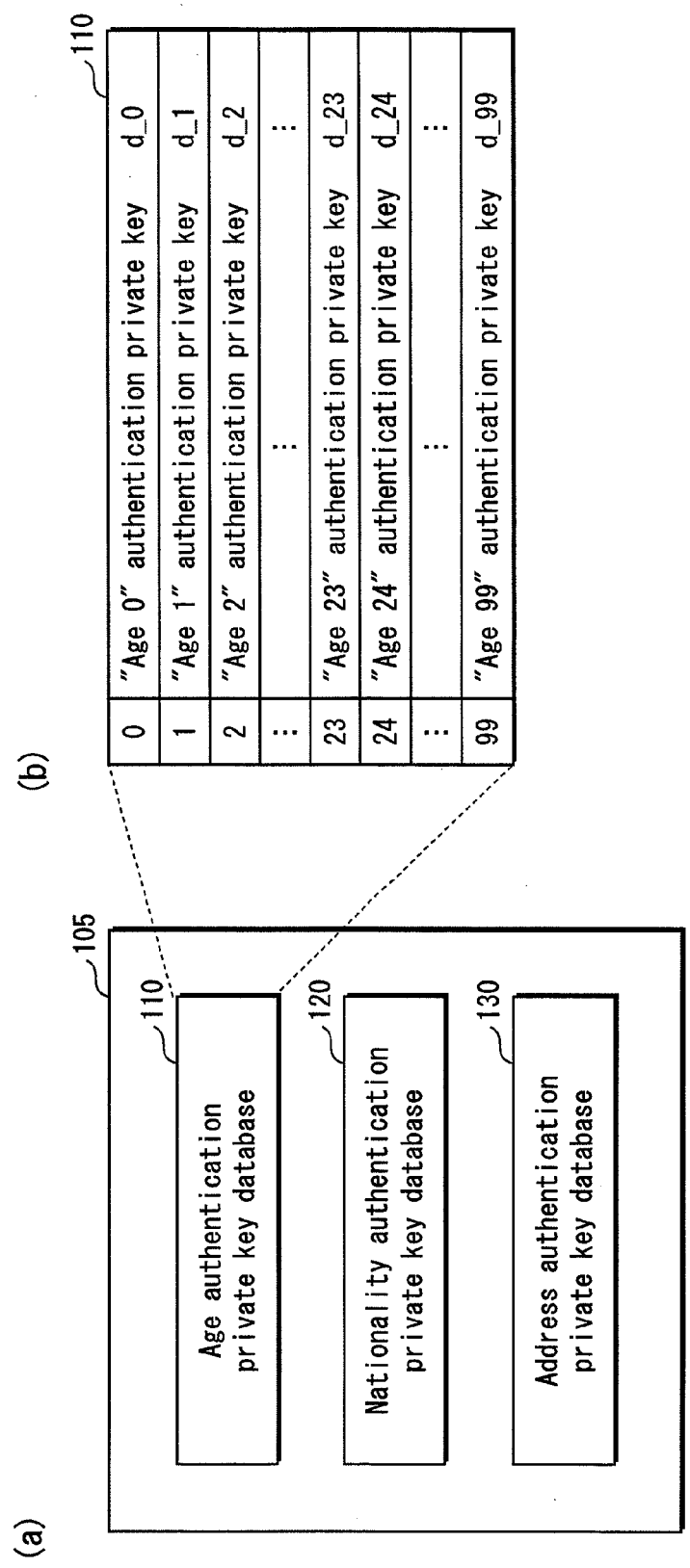
FIG. 3A shows databases stored in the identification authentication private key holding unit 105.
FIG. 3B shows the data structure of the age authentication private key database 110.

FIG. 3A shows each database stored in the identification authentication private key holding unit 105.

FIG. 3B shows the data structure of the age authentication private key database 110. As shown in FIG. 3B, the age authentication private key database 110 contains numbers respectively indicating ages 0 through 99, and contains age authentication private keys d__0 through d__99 in correspondence with the ages.

Figure 4:
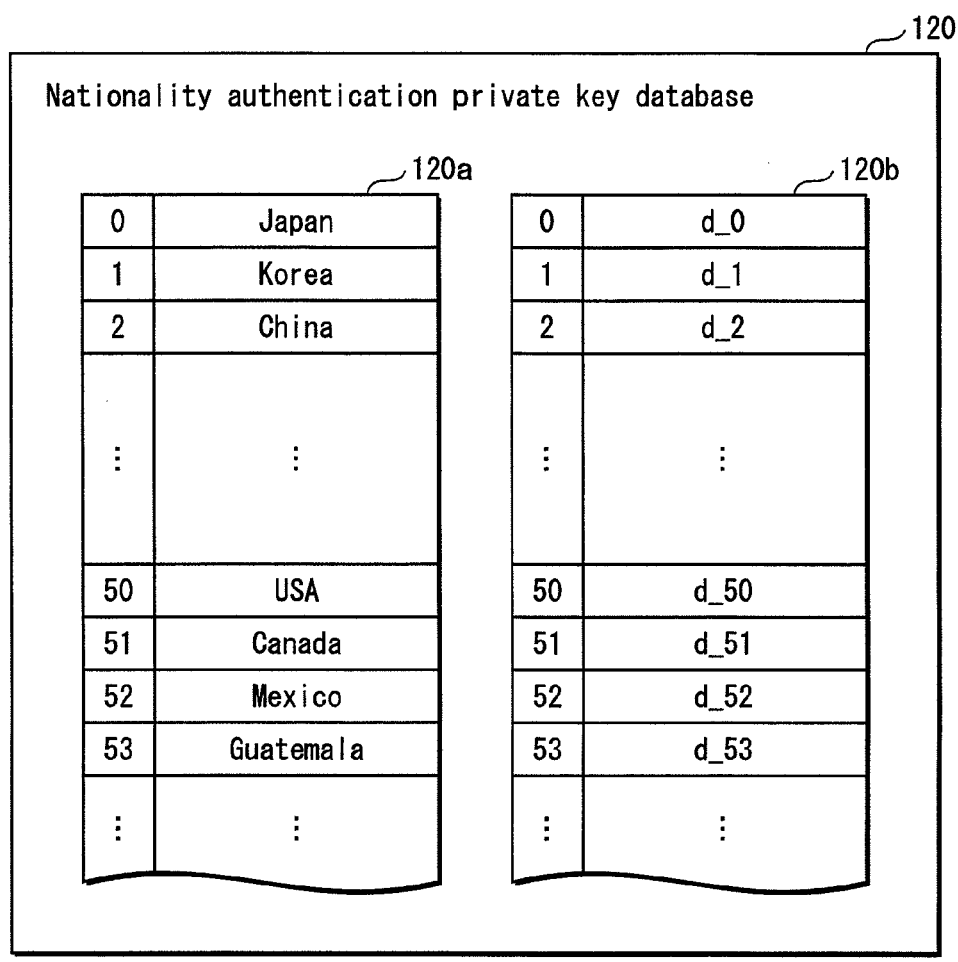
FIG. 4 shows the data structure of the nationality authentication private key database 120.

FIG. 4 shows the data structure of the nationality authentication private key database 120. As shown in FIG. 4, the nationality authentication private key database 120 includes a number—nation name correspondence table 120a and a number—nationality authentication private key correspondence table 120b. The number—nation name correspondence table 120a shows correspondence between numbers starting with 0 and nation names. The number—nationality authentication private key correspondence table 120b shows correspondence between numbers starting with 0 and nationality authentication private keys d__0, d__1, d__2, . . . that are used to authenticate the nation names shown in the number—nation name correspondence table 120a in correspondence with the same numbers. For example, "Japan" authentication private key used to authenticate nation name "Japan" is d__0; "Korea" authentication private key used to authenticate nation name "Korea" is d__1; and "USA" authentication private key used to authenticate nation name "USA" is d__50.

Figure 5:
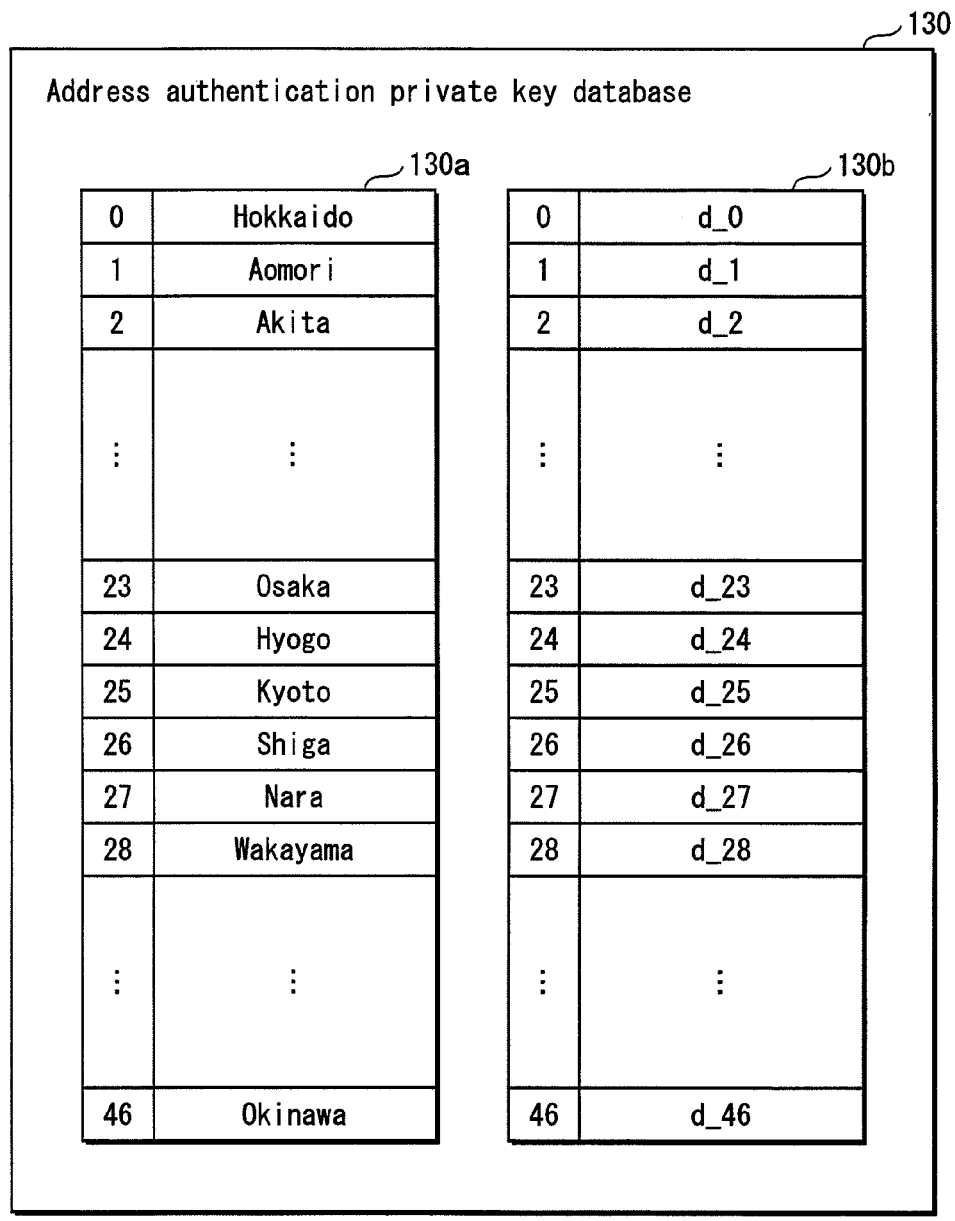
FIG. 5 shows the data structure of the address authentication private key database 130.

FIG. 5 shows the data structure of the address authentication private key database 130. As shown in FIG. 5, the address authentication private key database 130 includes a number—todofuken name correspondence table 130a and a number—address authentication private key correspondence table 130b. The number—todofuken name correspondence table 130a shows correspondence between numbers starting with 0 and todofuken names. The number—address authentication private key correspondence table 130b shows correspondence between numbers starting with 0 and address authentication private keys d__0, d__1, d__2, . . . that are used to authenticate the todofuken names shown in the number—todofuken name correspondence table 130a in correspondence with the same numbers. For example, the address authentication private key d__0 is used to authenticate todofuken name "Hokkaido"; the address authentication private key d__23 is used to authenticate todofuken name "Osaka"; and the address authentication private key d__24 is used to authenticate todofuken name "Hyogo".

Figures 6, 7:
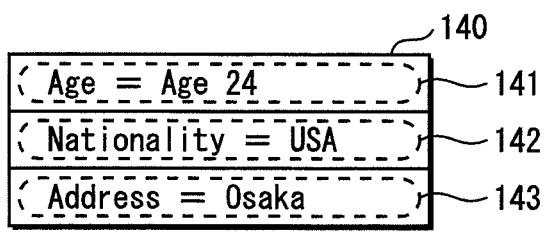
FIG. 6 shows the data structure of the age obfuscation public key database 300.
FIG. 7 shows the data structure of the user identification information 140.

FIG. 6 shows the data structure of the age obfuscation public key database 300. As shown in FIG. 6, the age obfuscation public key database 300 contains numbers respectively indicating ages 0 through 99, and contains age obfuscation public keys (e__0, n__0) through (e__99, n__99) in correspondence with the ages.

The procedures of generating each authentication private key and each obfuscation public key will be described later in the description of the operation.

(3) Identification Authentication Information Issuance Request Data Receiving Unit 103

The identification authentication information issuance request data receiving unit 103 is composed of a network connection unit and the like.

The identification authentication information issuance request data receiving unit 103 receives identification authentication information issuance request data from the service use device 20 via the network 60, and outputs the received identification authentication information issuance request data to the user identification information confirming unit 104.

(4) User Identification Information Confirming Unit 104

The user identification information confirming unit 104 receives the identification authentication information issuance request data from the identification authentication information issuance request data receiving unit 103. The user identification information confirming unit 104 extracts user identification information 140 from the received identification authentication information issuance request data.

FIG. 7 shows the data structure of the user identification information 140. As shown in FIG. 7, the user identification information 140 contains age information (age=age 24) 141, nationality information (nationality=USA) 142, and address information (address=Osaka) 143. It should be noted here that in the present embodiment, the age information, nationality information, and address information may be generically called "identification information".

The user identification information confirming unit 104 confirms whether or not the user identification information 140 is authenticated. As one example of the confirmation method, the user identification information confirming unit 104 confirms as follows. That is to say, the authentication device 10 is connected with a resident registration database held by a public institution such as a municipal office, via the network 60, and confirms whether or not the user identification information 140 is authenticated by making reference to the resident registration database.

Upon confirming that the user identification information 140 is authenticated, the user identification information confirming unit 104 outputs the user identification information 140 to the identification authentication information generating unit 106. Upon confirming that the user identification information 140 is not authenticated, the authentication device 10 ends the identification authentication information issuance process.

(5) Identification Authentication Private Key Holding Unit 105

The identification authentication private key holding unit 105 holds the age authentication private key database 110, the nationality authentication private key database 120, and the address authentication private key database 130 that are generated by the obfuscation public key generating unit 102. The structures of these databases are as described above.

(6) Identification Authentication Information Generating Unit 106

Figure 8:
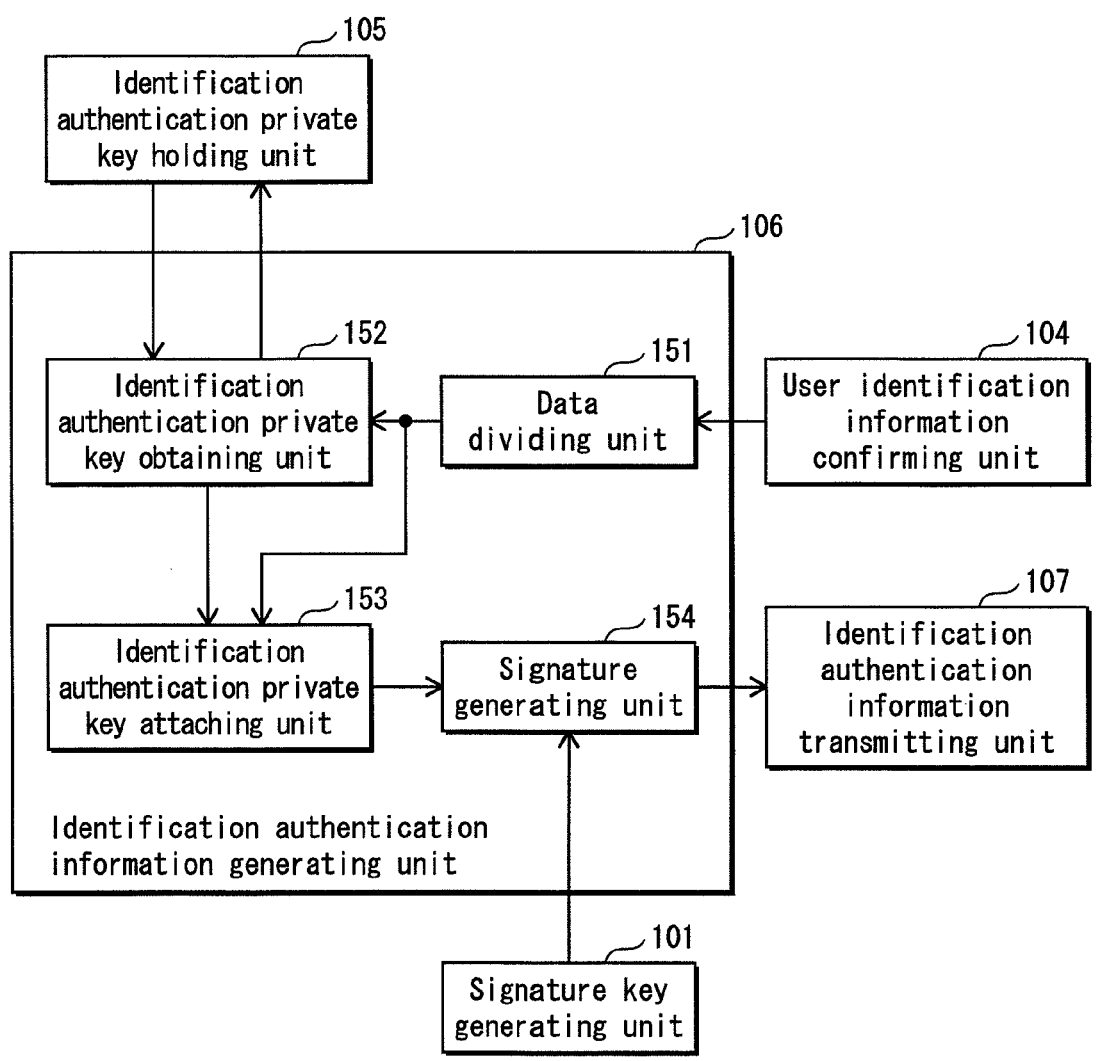
FIG. 8 is a functional block diagram functionally showing the structure of the identification authentication information generating unit 106.

FIG. 8 is a functional block diagram functionally showing the structure of the identification authentication information generating unit 106. As shown in FIG. 8, the identification authentication information generating unit 106 includes a data dividing unit 151, an identification authentication private key obtaining unit 152, an identification authentication private key attaching unit 153, and a signature generating unit 154.

(a) Data Dividing Unit 151

The data dividing unit 151 receives the user identification information 140 from the user identification information confirming unit 104. The data dividing unit 151 outputs the user identification information 140 to the identification authentication private key obtaining unit 152 and the identification authentication private key attaching unit 153.

(b) Identification Authentication Private Key Obtaining Unit 152

The identification authentication private key obtaining unit 152 receives the user identification information 140 from the data dividing unit 151. The identification authentication private key obtaining unit 152 reads out, from the identification authentication private key holding unit 105, identification authentication private keys that correspond to each piece of identification information contained in the user identification information 140.

More specifically, the identification authentication private key obtaining unit 152 refers to the age information (age=age 24) 141 contained in the user identification information 140, and obtains "age 24" authentication private key d_24 corresponding to "age 24", from the age authentication private key database 110. Similarly, the identification authentication private key obtaining unit 152 refers to the nationality information (nationality=USA) 142, and obtains "USA" authentication private key d_50 corresponding to "USA", from the nationality authentication private key database 120. Similarly, the identification authentication private key obtaining unit 152 refers to the address information (address=Osaka) 143, and obtains "Osaka" authentication private key d_23 corresponding to "Osaka", from the address authentication private key database 130.

The identification authentication private key obtaining unit 152 outputs the obtained age authentication private key d_24, nationality authentication private key d_50, and address authentication private key d_23 to the identification authentication private key attaching unit 153.

(c) Identification Authentication Private Key Attaching Unit 153

The identification authentication private key attaching unit 153 receives the user identification information 140 from the data dividing unit 151. The identification authentication private key attaching unit 153 also receives the "age 24" authentication private key d_24, "USA" authentication private key d_50, and "Osaka" authentication private key d_23 from the identification authentication private key obtaining unit 152.

The identification authentication private key attaching unit 153 generates age authentication information 161 by combining the age information (age=age 24) contained in the user identification information 140, with the "age 24" authentication private key d_24. Similarly, the identification authentication private key attaching unit 153 generates nationality authentication information 162 by combining the nationality information (nationality=USA) with the "USA" authentication private key d_50. Similarly, the identification authentication private key attaching unit 153 generates address authentication information 163 by combining the address information (address=Osaka) with the "Osaka" authentication private key d_23.

The identification authentication private key attaching unit 153 outputs the generated age authentication information 161, nationality authentication information 162, and address authentication information 163 to the signature generating unit 154.

(d) Signature Generating Unit 154

The signature generating unit 154 receives the age authentication information 161, nationality authentication information 162, and address authentication information 163 from the identification authentication private key attaching unit 153.

The signature generating unit 154 also receives the signature generation key from the signature key generating unit 101.

The signature generating unit 154 generates authentication device signature data 164 in accordance with a predetermined signature generation algorithm, using the received signature generation key. The authentication device signature data 164 is a digital signature for the age authentication information 161, nationality authentication information 162, and address authentication information 163.

Figure 9:
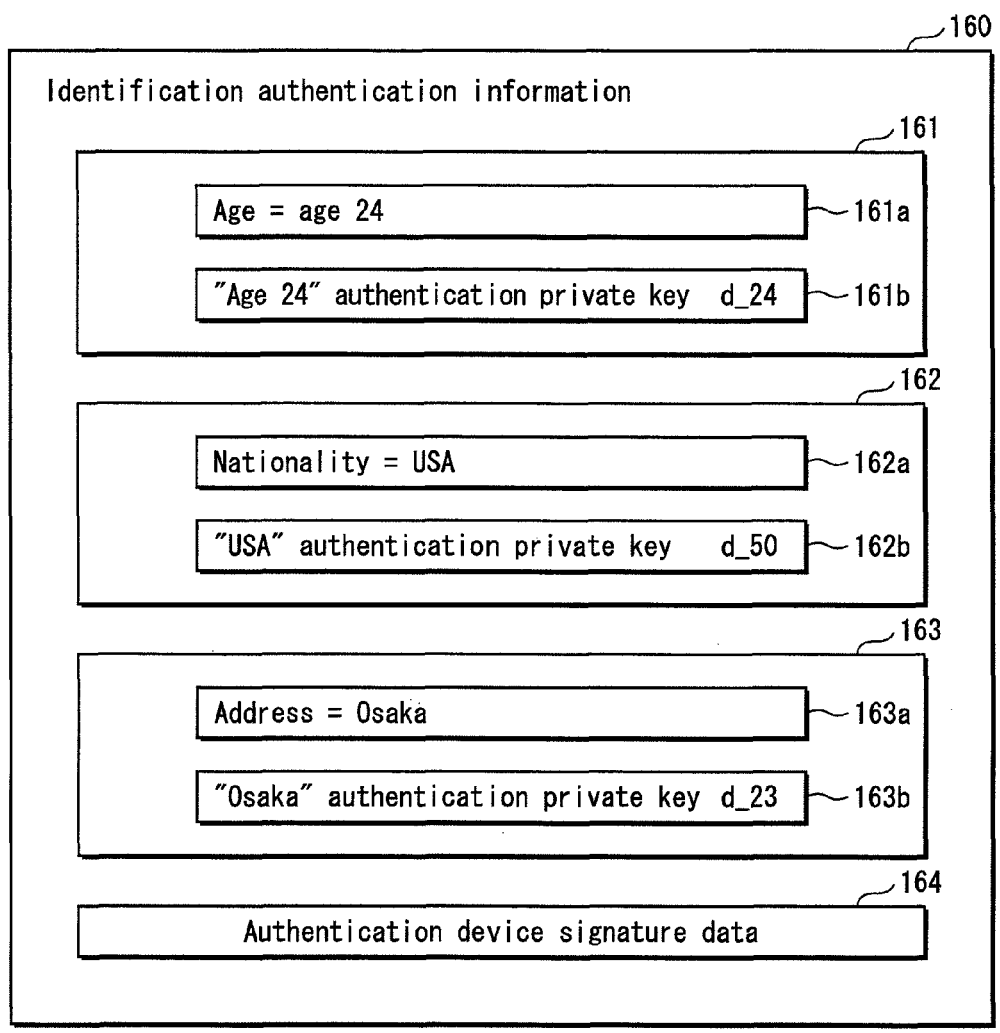
FIG. 9 shows the data structure of the identification authentication information 160.

The signature generating unit 154 generates identification authentication information 160 that is composed of the age authentication information 161, nationality authentication information 162, address authentication information 163, and authentication device signature data 164. FIG. 9 shows the data structure of the identification authentication information 160.

The signature generating unit 154 outputs the generated identification authentication information 160 to the identification authentication information transmitting unit 107.

(7) Identification Authentication Information Transmitting Unit 107

The identification authentication information transmitting unit 107 receives the identification authentication information 160 from the signature generating unit 154, and transmits the received identification authentication information to the service use device 20 via the network 60.

2. Service Use Device 20

Figure 10:
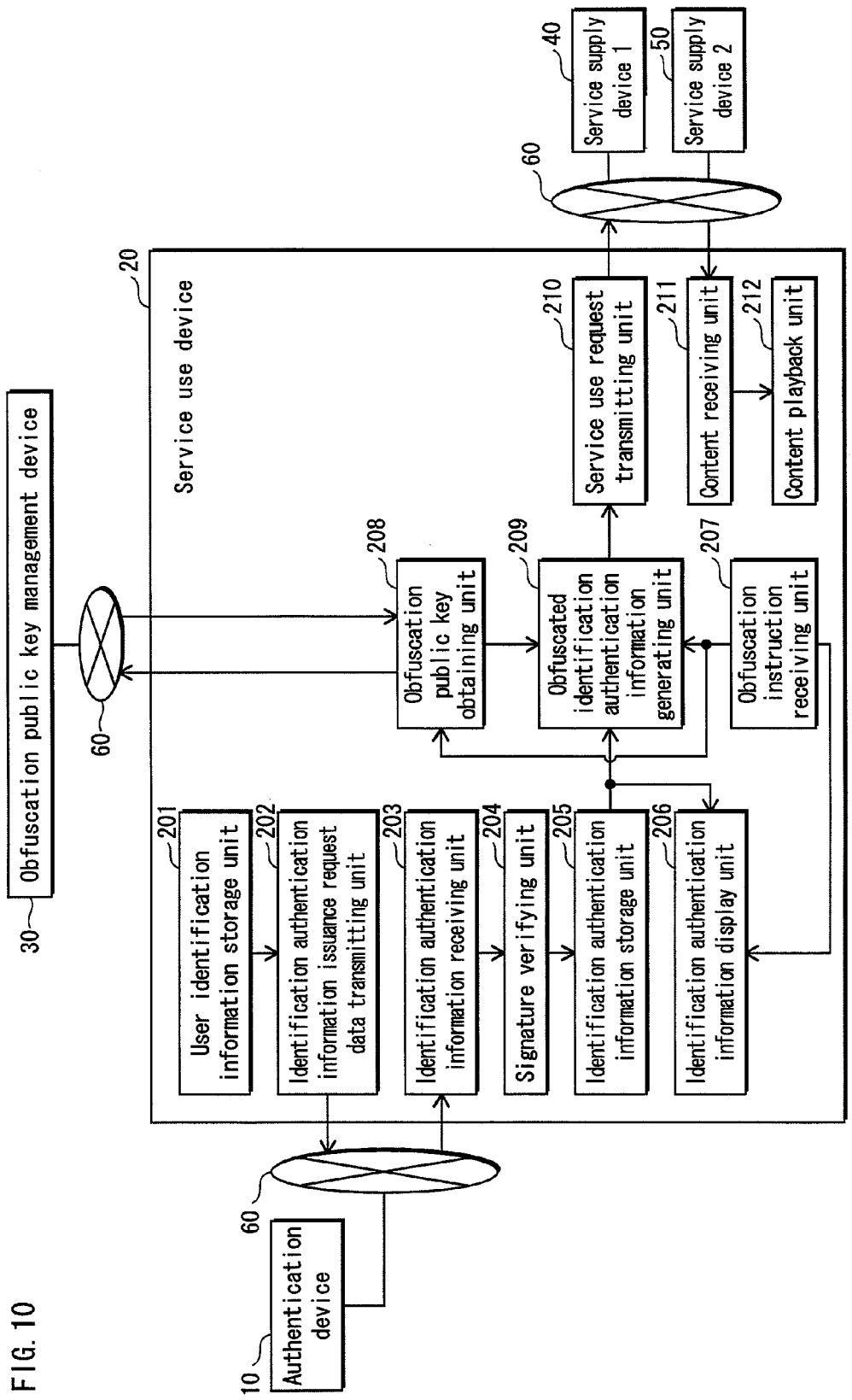
FIG. 10 is a functional block diagram functionally showing the structure of the service use device 20.

FIG. 10 is a functional block diagram functionally showing the structure of the service use device 20. As shown in FIG. 10, the service use device 20 includes a user identification information storage unit 201, an identification authentication information issuance request data transmitting unit 202, an identification authentication information receiving unit 203, a signature verifying unit 204, an identification authentication information storage unit 205, an identification authentication information display unit 206, an obfuscation instruction receiving unit 207, an obfuscation public key obtaining unit 208, an obfuscated identification authentication information generating unit 209, a service use request transmitting unit 210, a content receiving unit 211, and a content playback unit 212.

The service use device 20 is specifically a computer system that includes a microprocessor, ROM, RAM, a hard disk unit, a network connection unit, a display unit, a keyboard, a mouse and the like. A computer program is stored in the RAM or the hard disk unit. The microprocessor operates in accordance with the computer program and causes the service use device 20 to achieve its functions.

(1) User Identification Information Storage Unit 201

The user identification information storage unit 201 stores the user identification information 140 that is personal information of the user of the service use device 20. The user identification information 140, as described earlier with reference to FIG. 7, contains age information (age=age 24) 141, nationality information (nationality=USA) 142, and address information (address=Osaka) 143.

(2) Identification Authentication Information Issuance Request Data Transmitting Unit 202

The identification authentication information issuance request data transmitting unit 202 receives an instruction for obtaining the identification authentication information, from the user via an input device such as the keyboard or mouse.

Upon receiving the instruction for obtaining identification authentication information, the identification authentication information issuance request data transmitting unit 202 reads out the user identification information 140 from the user identification information storage unit 201, and generates identification authentication information issuance request data that contains the read-out user identification information 140.

The identification authentication information issuance request data transmitting unit 202 transmits the generated identification authentication information issuance request data to the authentication device 10 via the network 60.

(3) Identification Authentication Information Receiving Unit 203

The identification authentication information receiving unit 203 receives the identification authentication information 160 from the authentication device 10 via the network 60.

The identification authentication information 160 is composed of the age authentication information 161, nationality authentication information 162, address authentication information 163, and authentication device signature data 164, as shown in FIG. 9. The age authentication information 161 is composed of age information (age=age 24) 161$a$ and "age 24" authentication private key (d__24) 161$b$. The nationality authentication information 162 is composed of nationality information (nationality=USA) 162$a$ and "USA" authentication private key (d__50) 162$b$. The address authentication information 163 is composed of address information (address=Osaka) 163$a$ and "Osaka" authentication private key (d__23) 163$b$.

The identification authentication information receiving unit 203 outputs the received identification authentication information 160 to the signature verifying unit 204.

(4) Signature Verifying Unit 204

The signature verifying unit 204 receives and stores the signature verification key generated by the authentication device 10 when the authentication system 1 is booted.

Upon receiving the identification authentication information 160 from the identification authentication information receiving unit 203, the signature verifying unit 204 verifies the authentication device signature data 164 in accordance with a predetermined signature verification algorithm, using the signature verification key. When the result of the verification is success, the signature verifying unit 204 outputs the identification authentication information 160 to the identification authentication information storage unit 205. When the result of the verification is failure, the signature verifying unit 204 discards the identification authentication information 160.

(5) Identification Authentication Information Storage Unit 205

The identification authentication information storage unit 205 receives the identification authentication information 160 from the signature verifying unit 204, and stores the received identification authentication information 160 therein.

(6) Identification Authentication Information Display Unit 206

The identification authentication information display unit 206 is equipped with a display. Upon receiving a service use request from the user via an input device such as the keyboard or mouse, the identification authentication information display unit 206 reads out the identification authentication information 160 from the identification authentication information storage unit 205. The identification authentication information display unit 206 extracts the age information (age=age 24) 161$a$, nationality information (nationality=USA) 162$a$, and address information (address=Osaka) 163$a$, from the read-out identification authentication information 160.

The identification authentication information display unit 206 generates a presentation information selection screen that includes a message "Please select information to present to service supply device", as well as the extracted age information (age=age 24) 161*a*, nationality information (nationality=USA) 162*a*, and address information (address=Osaka) 163*a*.

The identification authentication information display unit 206 displays the generated presentation information selection screen on the display.

After the information to present to the service supply device is selected via the obfuscation instruction receiving unit 207, the identification authentication information display unit 206 generates an obfuscation instruction receiving screen that queries the user what obfuscation process the selected information should be subjected to. The identification authentication information display unit 206 displays the generated obfuscation instruction receiving screen on the display.

(7) Obfuscation Instruction Receiving Unit 207

The obfuscation instruction receiving unit 207 prestores therein the number—nation name correspondence table 120*a* (see FIG. 4) and the number—todofuken name correspondence table 130*a* (see FIG. 5).

While the presentation information selection screen is displayed on the identification authentication information display unit 206, the obfuscation instruction receiving unit 207 receives, from the user via an input device such as the keyboard or mouse, an indication of identification information which should be subjected to the obfuscation process, and was selected from among the age information (age=age 24) 161*a*, nationality information (nationality=USA) 162*a*, and address information (address=Osaka) 163*a*. The present embodiment is based on the presumption that it is known that the user needs to present "age" to the service supply device 1 (40), and needs to present "age", "nationality", and "address" to the service supply device 2 (50).

Upon receiving the indication of selected information that should be presented to a service supply device, the obfuscation instruction receiving unit 207 notifies the identification authentication information display unit 206 of the selected information.

While the obfuscation instruction receiving screen is displayed on the identification authentication information display unit 206, the obfuscation instruction receiving unit 207 receives an obfuscation instruction from the user via an input device. Here, the received obfuscation instruction is input as values of (X,Y).

In the following, obfuscation instruction (X,Y) will be described more specifically.

For example, when the age information (age=age 24) 161*a* should be presented to a service supply device as the identification information and obfuscation instruction (X,Y) is received, the age information is obfuscated by converting the age 24 to a range from age (24−X) to age (24+Y). In this case, when X is 0 and Y is 3, 24−0=24 and 24+3=27, and the "age 24" is obfuscated as "one of age 24, age 25, age 26, and age 27".

Described next is how to obfuscate the nationality "USA" and address "Osaka" when the nationality information (nationality=USA) 162*a* and address information (address=Osaka) 163*a* should be presented to a service supply device.

When the nationality information (nationality=USA) 162*a* should be presented to a service supply device as the identification information and obfuscation instruction (X=0,Y=3) is received, the following calculation is made onto the number "50" that corresponds to the "USA" in the number—nation name correspondence table 120*a* shown in FIG. 4: 50−0=50 and 50+3=53. Based on the results of this calculation, it is possible to obfuscate the nationality "USA" as "one of USA, Canada, Mexico, and Guatemala".

When the address information (address=Osaka) 163*a* should be presented to a service supply device as the identification information and obfuscation instruction (X=0,Y=3) is received, the following calculation is made onto the number "23" that corresponds to the "Osaka" in the number—todofuken name correspondence table 130*a* shown in FIG. 5: 23−0=23 and 23+3=26. Based on the results of this calculation, it is possible to obfuscate the address "Osaka" as "one of Osaka, Hyogo, Kyoto, and Shiga".

When the identification information that is to be subjected to the obfuscation process is the age information 161*a*, the obfuscation instruction receiving unit 207 outputs the "age=age 24" and the received obfuscation instruction (X,Y) to the obfuscation public key obtaining unit 208 and the obfuscated identification authentication information generating unit 209. When the identification information that is to be subjected to the obfuscation process is the nationality information (nationality=USA) 162*a*, the obfuscation instruction receiving unit 207 outputs information indicating that the nationality information should be obfuscated, the number "50" that corresponds to the "USA", and the received obfuscation instruction (X,Y) to the obfuscation public key obtaining unit 208 and the obfuscated identification authentication information generating unit 209. When the identification information that is to be subjected to the obfuscation process is the address information (address=Osaka) 163*a*, the obfuscation instruction receiving unit 207 outputs information indicating that the address information should be obfuscated, the number "23" that corresponds to the "Osaka", and the received obfuscation instruction (X,Y) to the obfuscation public key obtaining unit 208 and the obfuscated identification authentication information generating unit 209.

(8) Obfuscation Public Key Obtaining Unit 208

The obfuscation public key obtaining unit 208, when it receives the "age=age 24" and the received obfuscation instruction (X,Y) from the obfuscation instruction receiving unit 207, generates an age obfuscation public key obtainment request for requesting all obfuscation public keys that fall within a range from "24−0=24" to "24+3=27". The obfuscation public key obtaining unit 208 transmits the generated age obfuscation public key obtainment request to the obfuscation public key management device 30 via the network 60. The obfuscation public key obtaining unit 208 receives the age obfuscation public keys in correspondence with the request, from the obfuscation public key management device 30 via the network 60. For example, when the obfuscation instruction is (X=0, Y=3), the obfuscation public key obtaining unit 208 receives "age 24" obfuscation public key (e_24,n_24), "age 25" obfuscation public key (e_25,n_25), "age 26" obfuscation public key (e_26,n_26), and "age 27" obfuscation public key (e_27,n_27).

The obfuscation public key obtaining unit 208, when it receives the number "50", which corresponds to the "USA", and obfuscation instruction (X=0, Y=3) from the obfuscation instruction receiving unit 207, generates a nationality obfuscation public key obtainment request for requesting all obfuscation public keys that fall within a range from 50−0=50 to 50+3=53. The obfuscation public key obtaining unit 208 transmits the generated nationality obfuscation public key obtainment request to the obfuscation public key management device 30 via the network 60. The obfuscation public key obtaining unit 208 receives the nationality obfuscation public keys in correspondence with the request, from the obfuscation public key management device 30 via the network 60.

The obfuscation public key obtaining unit 208, when it receives the number "23", which corresponds to the "Osaka", and obfuscation instruction (X=0,Y=3) from the obfuscation instruction receiving unit 207, generates an address obfuscation public key obtainment request for requesting all obfuscation public keys that fall within a range from 23−0=23 to 23+3=26. The obfuscation public key obtaining unit 208 transmits the generated address obfuscation public key obtainment request to the obfuscation public key management device 30 via the network 60. The obfuscation public key obtaining unit 208 receives the address obfuscation public keys in correspondence with the request, from the obfuscation public key management device 30 via the network 60.

The obfuscation public key obtaining unit 208 outputs the obtained obfuscation public keys to the obfuscated identification authentication information generating unit 209.

(9) Obfuscated Identification Authentication Information Generating Unit 209

Figure 11:
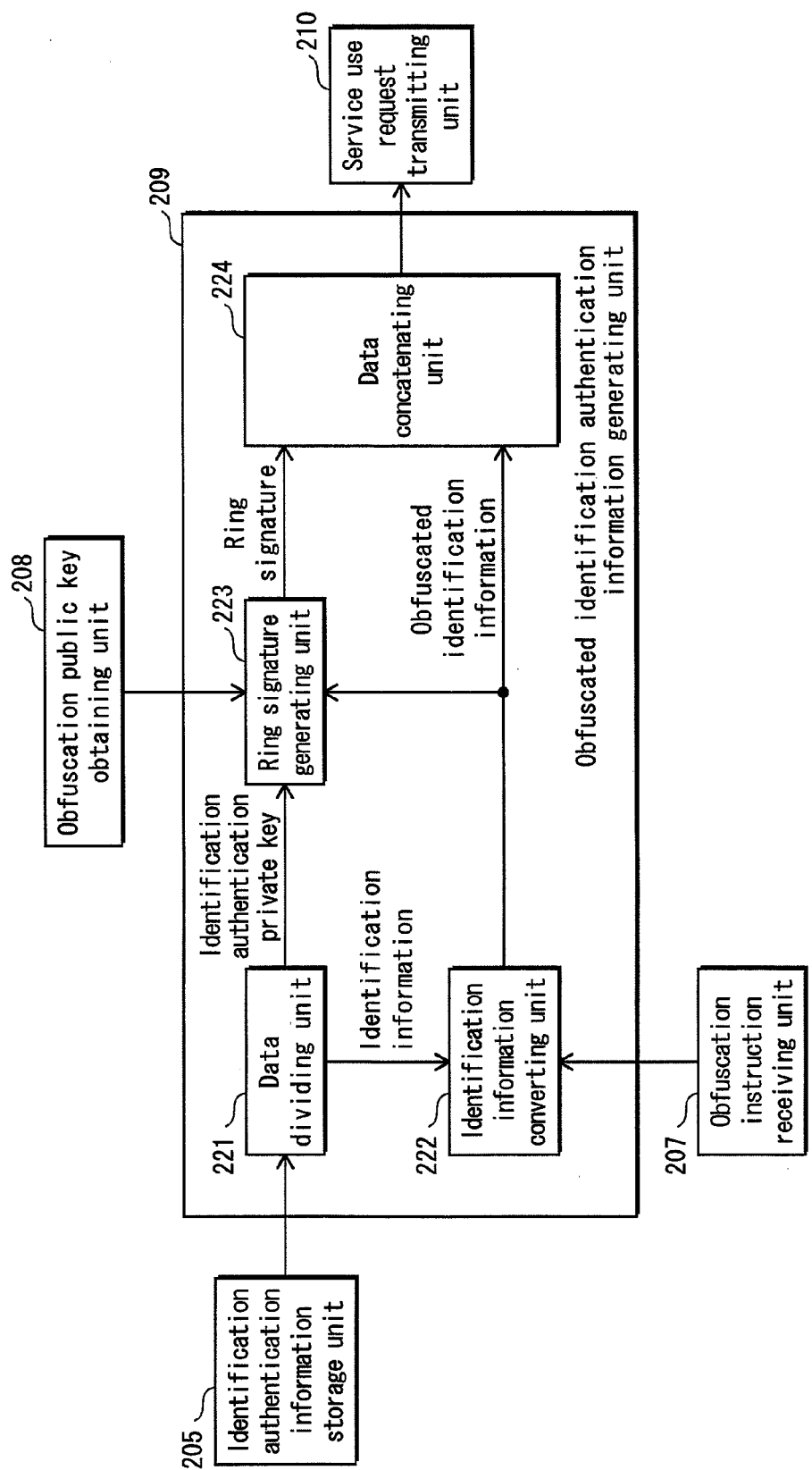
FIG. 11 is a functional block diagram functionally showing the structure of the obfuscated identification authentication information generating unit 209.

FIG. 11 is a functional block diagram functionally showing the structure of the obfuscated identification authentication information generating unit 209. As shown in FIG. 11, the obfuscated identification authentication information generating unit 209 includes a data dividing unit 221, an identification information converting unit 222, a ring signature generating unit 223, and a data concatenating unit 224.

(a) Data Dividing Unit 221

The data dividing unit 221 reads the identification authentication information 160 from the identification authentication information storage unit 205. The data dividing unit 221 divides the age authentication information 161 contained in the identification authentication information 160 into the age information (age=age 24) 161*a* and "age 24" authentication private key 161*b*. The data dividing unit 221 divides the nationality authentication information 162 into the nationality information (nationality=USA) 162*a* and the "USA" authentication private key 162*b*, and divides the address authentication information 163 into the address information (address=Osaka) 163*a* and the "Osaka" authentication private key 163*b*.

The data dividing unit 221 outputs the age information (age=age 24) 161*a*, the nationality information (nationality=USA) 162*a* and the address information (address=Osaka) 163*a* to the identification information converting unit 222, and outputs the "age 24" authentication private key 161*b*, the "USA" authentication private key 162*b* and the "Osaka" authentication private key 163*b* to the ring signature generating unit 223.

(b) Identification Information Converting Unit 222

The identification information converting unit 222 prestores therein the number—nation name correspondence table 120*a* (see FIG. 4) and the number—todofuken name correspondence table 130*a* (see FIG. 5).

The identification information converting unit 222 receives the age information (age=age 24) 161*a*, the nationality information (nationality=USA) 162*a* and the address information (address=Osaka) 163*a* from the data dividing unit 221.

When it receives "age=age 24" and obfuscation instruction (X,Y) from the obfuscation instruction receiving unit 207, the identification information converting unit 222 generates obfuscated age information by obfuscating "age=age 24" based on the received obfuscation instruction. More specifically, when X=0, Y=3, the identification information converting unit 222 generates obfuscated age information "age=age 24, age 25, age 26, age 27".

When it receives information indicating that the nationality information should be obfuscated, the number "50", and the obfuscation instruction (X,Y) from the obfuscation instruction receiving unit 207, the identification information converting unit 222 generates obfuscated nationality information by obfuscating "nationality=USA" based on the received obfuscation instruction. More specifically, when X=0, Y=3, the identification information converting unit 222 reads nation names corresponding to the numbers from "50" to "53" from the number—nation name correspondence table 120*a*, and generates obfuscated nationality information "nationality=USA, Canada, Mexico, Guatemala".

When it receives information indicating that the address information should be obfuscated, the number "23", and the obfuscation instruction (X,Y) from the obfuscation instruction receiving unit 207, the identification information converting unit 222 generates obfuscated address information by obfuscating "address=Osaka" based on the received obfuscation instruction. More specifically, when x=0, Y=3, the identification information converting unit 222 reads todofuken names corresponding to the numbers from "23" to "26" from the number—todofuken name correspondence table 130*a*, and generates obfuscated address information "address=Osaka, Hyogo, Kyoto, Shiga".

The identification information converting unit 222 generates obfuscated identification information that is composed of the generated obfuscated age information, obfuscated nationality information, and obfuscated address information. The identification information converting unit 222 outputs the generated obfuscated identification information to the ring signature generating unit 223 and the data concatenating unit 224. Here, for example, when the identification information that is subjected to the obfuscation process is only the age information, the obfuscated identification information is composed of only the obfuscated age information.

(c) Ring Signature Generating Unit 223

Here, first the ring signature will be described. The ring signature is a digital signature method for achieving the following functions (i) and (ii).

(i) When a ring signature is generated, ring signature S for message M is generated using one private key and one or more arbitrary number of arbitrary public keys.

(ii) When a ring signature is verified, only information that indicates public keys required for verifying ring signature S is presented to the verifier. The verifier verifies the ring signature S by using the public keys and can only confirm that the ring signature S was generated by using a private key corresponding to any one of the public keys used in the verification. The verifier, however, cannot recognize specifically which public key corresponds to the private key that was used for generating the ring signature S.

The present invention can be applied to any ring signature method that achieves the above-described functions (i) and (ii). It is presumed here that the ring signature generating unit 223 uses the ring signature method that is recited in "How to Leak a Secret" by Ronald L. Rives, Adi Shamir, and Yael Tuman, published in "Advances in Cryptology ASIA-CRYPT2001" (publisher: Springer).

Next, the process performed by the ring signature generating unit 223 will be described for each type of identification information that is subjected to the obfuscation process, using specific examples.

<Obfuscation Process for Age Information>

The ring signature generating unit 223 receives the "age 24" authentication private key (d__24) from the data dividing unit 221. The ring signature generating unit 223 also receives the obfuscated age information "age=age 24, age 25, age 26, age 27". The ring signature generating unit 223 further receives "age 24" obfuscation public key (e__24, n__24), "age 25" obfuscation public key (e__25,n__25), "age 26" obfuscation public key (e__26,n__26), and "age 27" obfuscation public key (e__27,n__27) from the obfuscation public key obtaining unit 208.

The ring signature generating unit 223 generates an age authentication ring signature "C__24, S__24, S__25, S__26, S__27" by regarding the obfuscated age information "age age 24, age 25, age 26, age 27" as the message M and using the "age 24" address authentication private key (d__24), the "age 24" obfuscation public key (e__24,n__24), "age 25" obfuscation public key (e__25,n__25), "age 26" obfuscation public key (e__26,n__26), and "age 27" obfuscation public key (e__27,n__27). The ring signature generating unit 223 outputs the generated age authentication ring signature "C__24, S__24, S__25, S__26, S__27" to the data concatenating unit 224.

The above-mentioned five pieces of data are generated as the age authentication ring signature. The generating procedures of these data will be described later in relation to the operation.

<Obfuscation Process for Nationality Information>

The ring signature generating unit 223 receives the "USA" authentication private key (d__50) from the data dividing unit 221. The ring signature generating unit 223 also receives the obfuscated nationality information "nationality=USA, Canada, Mexico, Guatemala". The ring signature generating unit 223 further receives "USA" obfuscation public key (e__50,n__50), "Canada" obfuscation public key (e__51,n__51), "Mexico" obfuscation public key (e__52,n__52), and "Guatemala" obfuscation public key (e__53,n__53) from the obfuscation public key obtaining unit 208.

The ring signature generating unit 223 generates a nationality authentication ring signature "C__50, S__50, S__51, S__52, S__53" by regarding the obfuscated nationality information "nationality=USA, Canada, Mexico, Guatemala" as the message M and using the "USA" authentication private key (d__50), the "USA" obfuscation public key (e__50,n__50), "Canada" obfuscation public key (e__51,n__51), "Mexico" obfuscation public key (e__52,n__52), and "Guatemala" obfuscation public key (e__53,n__53). The ring signature generating unit 223 outputs the generated nationality authentication ring signature "C__50, S__50, S__51, S__52, S__53" to the data concatenating unit 224.

<Obfuscation Process for Address Information>

The ring signature generating unit 223 receives the "Osaka" authentication private key (d__23) from the data dividing unit 221. The ring signature generating unit 223 also receives the obfuscated address information "address=Osaka, Hyogo, Kyoto, Shiga". The ring signature generating unit 223 further receives "Osaka" obfuscation public key (e__23,n__23), "Hyogo" obfuscation public key (e__24,n__24), "Kyoto" obfuscation public key (e__25,n__25), and "Shiga" obfuscation public key (e__26,n__26) from the obfuscation public key obtaining unit 208.

The ring signature generating unit 223 generates an address authentication ring signature "C__23, S__23, S__24, S__25, S__26" by regarding the obfuscated address information "address=Osaka, Hyogo, Kyoto, Shiga" as the message M and using the "Osaka" authentication private key (d 23), the "Osaka" obfuscation public key (e__23,n__23), "Hyogo" obfuscation public key (e__24,n__24), "Kyoto" obfuscation public key (e__25,n__25), and "Shiga" obfuscation public key (e__26,n__26). The ring signature generating unit 223 outputs the generated address authentication ring signature "C__23, S__23, S__24, S__25, S__26" to the data concatenating unit 224.

(d) Data Concatenating Unit 224

The data concatenating unit 224 receives the obfuscated age information, obfuscated nationality information, and obfuscated address information from the identification information converting unit 222. The data concatenating unit 224 also receives the age authentication ring signature, nationality authentication ring signature, and address authentication ring signature from the ring signature generating unit 223.

The data concatenating unit 224 generates obfuscated age authentication data by concatenating the obfuscated age information with the age authentication ring signature, generates obfuscated nationality authentication data by concatenating the obfuscated nationality information with the nationality authentication ring signature, and generates obfuscated address authentication data by concatenating the obfuscated address information with the address authentication ring signature.

The data concatenating unit 224 generates presentation identification authentication information by concatenating the obfuscated age authentication data, the obfuscated nationality authentication data, and the obfuscated address authentication data. The data concatenating unit 224 outputs the generated presentation identification authentication information to the service use request transmitting unit 210.

Figure 12A:
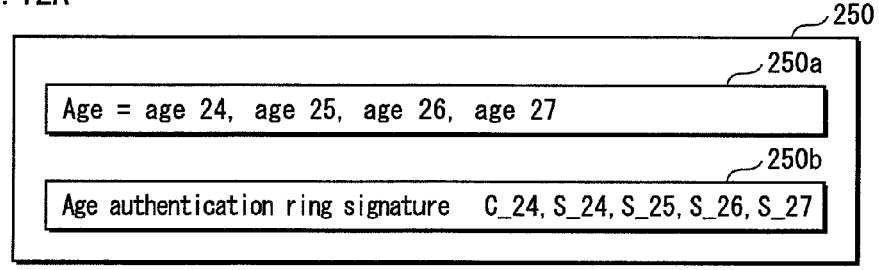
FIG. 12A shows the data structure of the presentation identification authentication information 250.

FIG. 12A shows one example of the presentation identification authentication information that is presented by the service use device 20 to the service supply device 1 (40). The identification information requested by the service supply device 1 (40) to be presented is only "age". As a result, presentation identification authentication information 250 is composed of only the obfuscated age authentication data, where the obfuscated age authentication data includes obfuscated age information "age=age 24, age 25, age 26, age 27" 250a and age authentication ring signature "C__24, S__24, S__25, S__26, S__27" 250b.

Figure 12B:
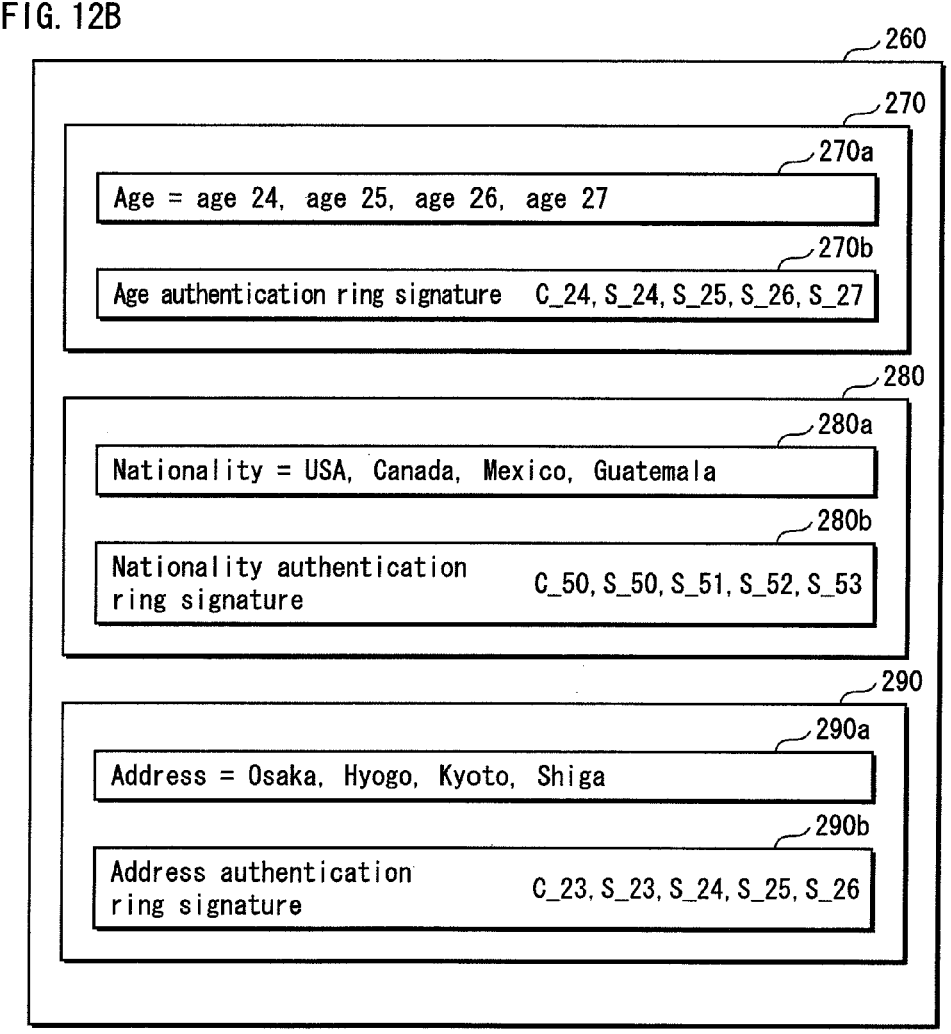
FIG. 12B shows the data structure of the presentation identification authentication information 260.

FIG. 12B shows one example of the presentation identification authentication information that is presented by the service use device 20 to the service supply device 2 (50). The identification information requested by the service supply device 2 (50) to be presented are "age", "nationality", and "address". As a result, presentation identification authentication information 260 is composed of obfuscated age authentication data 270, obfuscated nationality authentication data 280, and obfuscated address authentication data 290.

The obfuscated age authentication data 270 has the same contents as the obfuscated age authentication data shown in FIG. 12A. The obfuscated nationality authentication data 280 is composed of obfuscated nationality information "nationality=USA, Canada, Mexico, Guatemala" 280a and nationality authentication ring signature "C__50,S__50,S__51,S__52,S__53" 280b. The obfuscated address authentication data 290 is composed of obfuscated address information "address=Osaka, Hyogo, Kyoto, Shiga" 290a and address authentication ring signature "C__23, S__23, S__24, S__25, S__26" 290b.

(10) Service Use Request Transmitting Unit 210

The service use request transmitting unit 210 receives the presentation authentication information from the obfuscated identification authentication information generating unit 209. The service use request transmitting unit 210 generates a service use request by attaching a message indicating a use request, an ID of a content desired to be used, and the like to the presentation authentication information. The service use request transmitting unit 210 transmits the generated service use request to the service supply device 1 (40) or the service supply device 2 (50) via the network 60.

(11) Content Receiving Unit 211

The content receiving unit 211 receives a content from the service supply device 1 (40) or the service supply device 2 (50) via the network 60. The content receiving unit 211 outputs the received content to the content playback unit 212.

(12) Content Playback Unit 212

The content playback unit 212 is composed of a buffer, a decoder, a display and the like. Upon receiving a content from the content receiving unit 211, the content playback unit 212 decodes the received content and displays the decoded content onto the display.

3. Obfuscation Public Key Management Device 30

The obfuscation public key management device 30 is specifically a computer system that includes a microprocessor, ROM, RAM, a hard disk unit, a network connection unit and the like. A computer program is stored in the RAM or the hard disk unit. The microprocessor operates in accordance with the computer program and causes the obfuscation public key management device 30 to achieve its functions. It should be noted here that the functional structure of the obfuscation public key management device 30 is not illustrated.

The obfuscation public key management device 30, when the authentication system 1 is booted, obtains the age obfuscation public key database 300, the nationality obfuscation public key database, and the address obfuscation public key database from the authentication device 10, and manages them therein. The data structure of the age obfuscation public key database 300 is as shown in FIG. 6.

The obfuscation public key management device 30 receives the age obfuscation public key obtainment request, nationality obfuscation public key obtainment request, and address obfuscation public key obtainment request from the service use device 20 via the network 60. The obfuscation public key management device 30 reads out obfuscation public keys from the corresponding databases in accordance with the received obfuscation public key obtainment requests, and transmits the read-out obfuscation public keys to the service use device 20 via the network 60.

As one example, when it receives, from the service use device 20, an age obfuscation public key obtainment request for requesting all obfuscation public keys that fall within a range from age 24 to age 27, the obfuscation public key management device 30 reads out "age 24" obfuscation public key (e_24,n_24), "age 25" obfuscation public key (e_25, n_25), "age 26" obfuscation public key (e_26,n_26), and "age 27" obfuscation public key (e_27,n_27) from the age obfuscation public key database 300. The obfuscation public key management device 30 transmits the read-out obfuscation public keys to the service use device 20.

4. Service Supply Device 1 (40)

Figure 13:
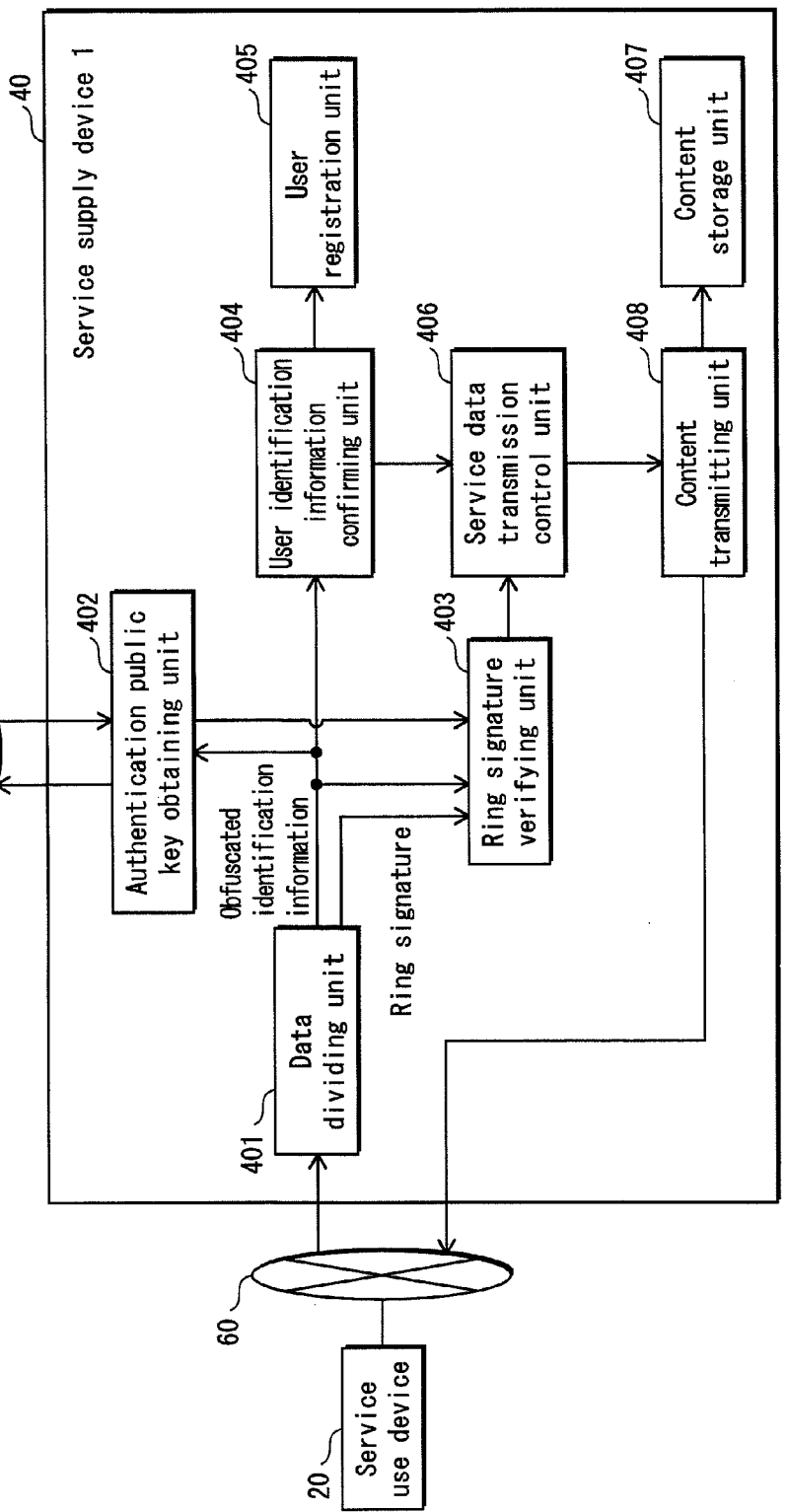
FIG. 13 is a functional block diagram functionally showing the structure of the service supply device 1 (40).

FIG. 13 is a functional block diagram functionally showing the structure of the service supply device 1 (40). As shown in FIG. 13, the service supply device 1 (40) includes a data dividing unit 401, an authentication public key obtaining unit 402, a ring signature verifying unit 403, a user identification information confirming unit 404, a user registration unit 405, a service data transmission control unit 406, a content storage unit 407, and a content transmitting unit 408.

The service supply device 1 (40) is specifically a computer system that includes a microprocessor, ROM, RAM, a hard disk unit, a network connection unit and the like. A computer program is stored in the RAM or the hard disk unit. The microprocessor operates in accordance with the computer program and causes the service supply device 1 (40) to achieve its functions.

The following will describe each constitutional element of the service supply device 1 (40).

(1) Data Dividing Unit 401

The data dividing unit 401 receives the service use request from the service use device 20 via the network 60. The data dividing unit 401 extracts the presentation identification authentication information from the received service use request.

In the following description of the service supply device 1 (40), it is presumed, as one specific example, that the data dividing unit 401 extracts the presentation identification authentication information 250 shown in FIG. 12A.

The data dividing unit 401 divides the presentation identification authentication information 250 into the obfuscated age information "age=age 24, age 25, age 26, age 27" 250*a* and the age authentication ring signature "C_24, S_24, S_25, S_26, S_27" 250*b*. The data dividing unit 401 outputs the obfuscated age information "age=age 24, age 25, age 26, age 27" 250*a* to the authentication public key obtaining unit 402 and the user identification information confirming unit 404, and outputs the age authentication ring signature "C_24, S_24, S_25, S_26, S_27" 250*b* to the ring signature verifying unit 403.

(2) Authentication Public Key Obtaining Unit 402

The authentication public key obtaining unit 402 receives the obfuscated age information "age=age 24, age 25, age 26, age 27" 250*a* from the data dividing unit 401. The authentication public key obtaining unit 402 generates an obfuscation public key obtainment request for requesting obfuscation public keys that respectively correspond to age 24, age 25, age 26, and age 27. The authentication public key obtaining unit 402 transmits the generated obfuscation public key obtainment request to the obfuscation public key management device 30 via the network 60.

The authentication public key obtaining unit 402 receives "age 24" obfuscation public key (e_24,n_24), "age 25" obfuscation public key (e_25,n_25), "age 26" obfuscation public key (e_26,n_26), and "age 27" obfuscation public key (e_27,n_27) from the obfuscation public key management device 30 via the network 60. The authentication public key obtaining unit 402 outputs the received obfuscation public keys for each age to the ring signature verifying unit 403.

(3) Ring Signature Verifying Unit 403

The ring signature verifying unit 403 receives the identification authentication information storage unit 205*b* from the data dividing unit 401, and further receives "age 24" obfuscation public key (e_24,n_24), "age 25" obfuscation public key (e_25,n_25), "age 26" obfuscation public key (e_26, n_26), and "age 27" obfuscation public key (e_27,n_27) from the authentication public key obtaining unit 402.

The ring signature verifying unit 403 verifies the identification authentication information storage unit 205*b* using the received obfuscation public keys for each age. The verification procedures will be described in detail later in relation to the operation.

When the result of the verification of the identification authentication information storage unit 205*b* is a success, the ring signature verifying unit 403 sends a signal indicating the success of the verification to the service data transmission control unit 406. When the result of the verification of the identification authentication information storage unit 205*b* is a failure, the ring signature verifying unit 403 ends the process.

(4) User Identification Information Confirming Unit 404

The user identification information confirming unit 404 receives the obfuscated age information "age=age 24, age 25, age 26, age 27" 250*a* from the data dividing unit 401.

The user identification information confirming unit 404 refers to the received obfuscated age information 250*a*, and judges whether or not the content requested from the service use device 20 can be supplied to the users of the ages indicated by the obfuscated age information 250*a*.

For example, when the content requested from the service use device 20 is restricted to "age 20 or more", the user identification information confirming unit 404 checks whether the obfuscated age information "age=age 24, age 25, age 26, age 27" 250*a* satisfies the condition "age 20 or more". In this example, the obfuscated age information "age=age 24, age 25, age 26, age 27" 250*a* satisfies the condition. Therefore, the user identification information confirming unit 404 judges that the requested content can be supplied. It is presumed here that the content supplied to the service use device 20 is identified by a content ID contained in the service use request.

When it judges that the requested content can be supplied, the user identification information confirming unit 404 outputs a signal indicating that the service is available to the service data transmission control unit 406, and outputs the obfuscated age information 250*a* to the user registration unit 405. When it judges that the requested content cannot be supplied, the user identification information confirming unit 404 may output a signal indicating that the service is not available to the service use device 20.

(5) User Registration Unit 405

The user registration unit 405 stores a user list with which users using the services are registered. Upon receiving the obfuscated age information 250*a* from the user identification information confirming unit 404, the user registration unit 405 registers the received obfuscated age information 250*a* with the user list.

(6) Service Data Transmission Control Unit 406

The service data transmission control unit 406, when it receives a signal indicating a success of a ring signature verification from the ring signature verifying unit 403, and receives a signal indicating that the service is available from the user identification information confirming unit 404, instructs the content transmitting unit 408 to read a content.

(7) Content Storage Unit 407

The content storage unit 407 is composed of a hard disk unit, and stores contents therein. Here, one example of a content stored therein is data that was generated by compress-encoding moving-picture data in compliance with the MPEG-2 (Moving Picture Experts Group Phase 2) standard. It should be noted here that the contents are not limited to moving-picture data, but may be still-picture data, music data, computer programs, game programs, maps or the like.

(8) Content Transmitting Unit 408

The content transmitting unit 408, when it receives, from the service data transmission control unit 406, an instruction for reading out a content, reads the content from the content storage unit 407. The content transmitting unit 408 transmits the read-out content to the service use device 20 via the network 60.

5. Service Supply Device 2 (50)

The service supply device 2 (50) has the same structure as the service supply device 1 (40) and its functional block diagram is not provided.

The service supply device 2 (50) is specifically a computer system that includes a microprocessor, ROM, RAM, a hard disk unit and the like.

The service supply device 2 (50), as is the case with the service supply device 1 (40), requests the user of the service use device 20 to present the identification authentication information when it supplies the service to the service use device 20. It is presumed here that the service supply device 2 (50) requests the user of the service use device to present the age, nationality, and address.

<Operation>

1. Overall Operation of System

Figure 14:
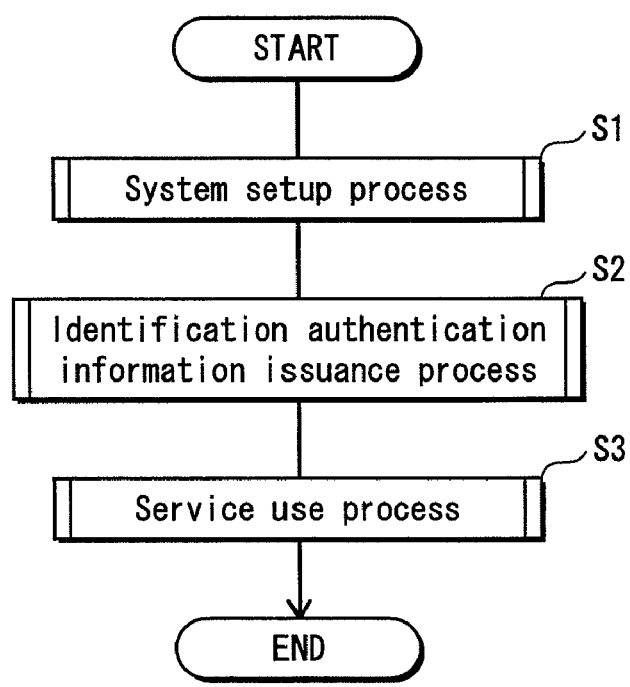
FIG. 14 is a flowchart showing the overall operation of the authentication system 1.

FIG. 14 is a flowchart showing the overall operation of the authentication system 1.

The authentication system 1 first performs the system setup process (step S1). After this, the authentication system 1 performs the identification authentication information issuance process (step S2). The authentication system 1 then performs the service use process (step S3).

2. Operation in System Setup Process

Figure 15:
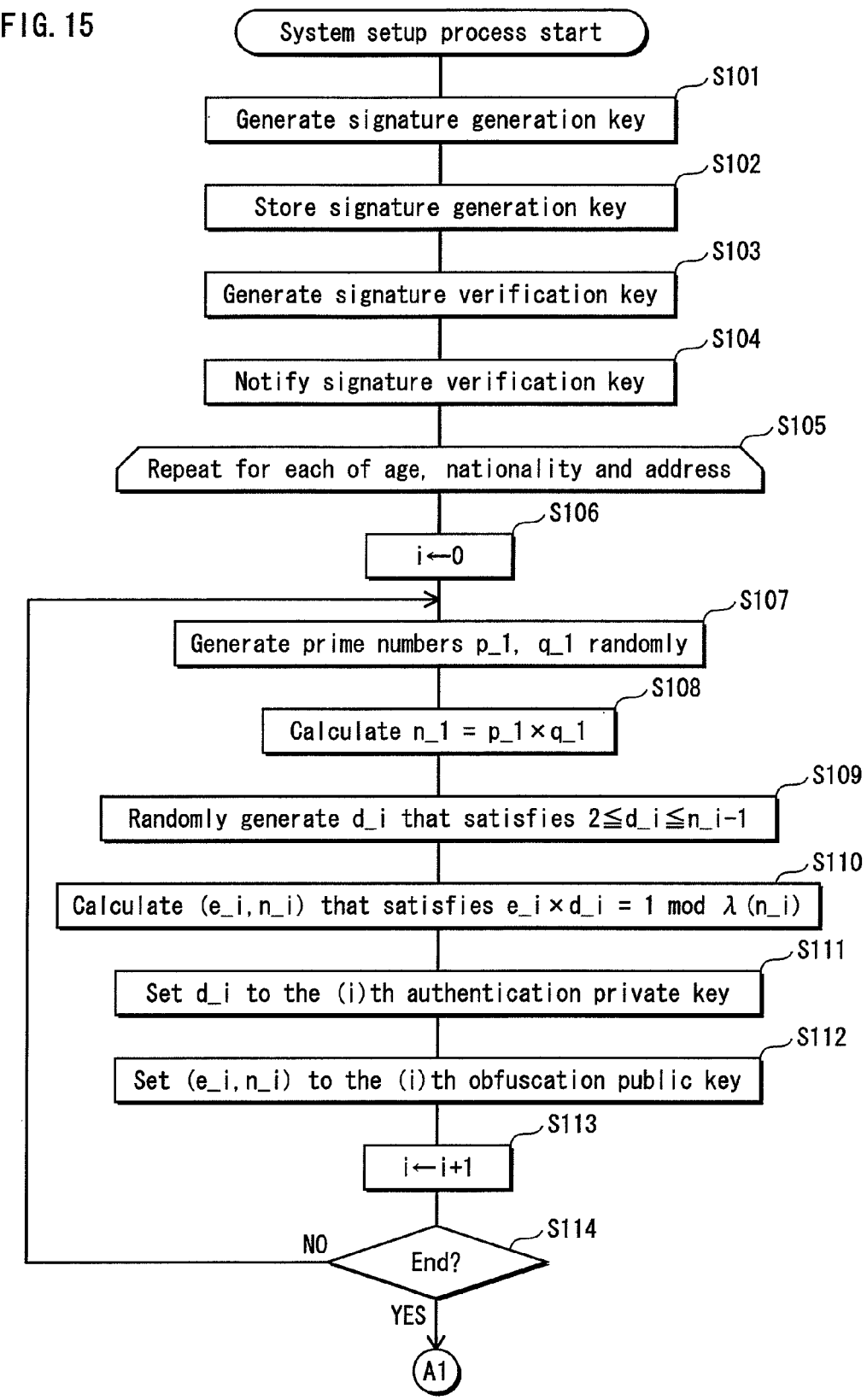
FIG. 15 is a flowchart showing the operation in the system setup process, continued to FIG. 16.
Figure 16:
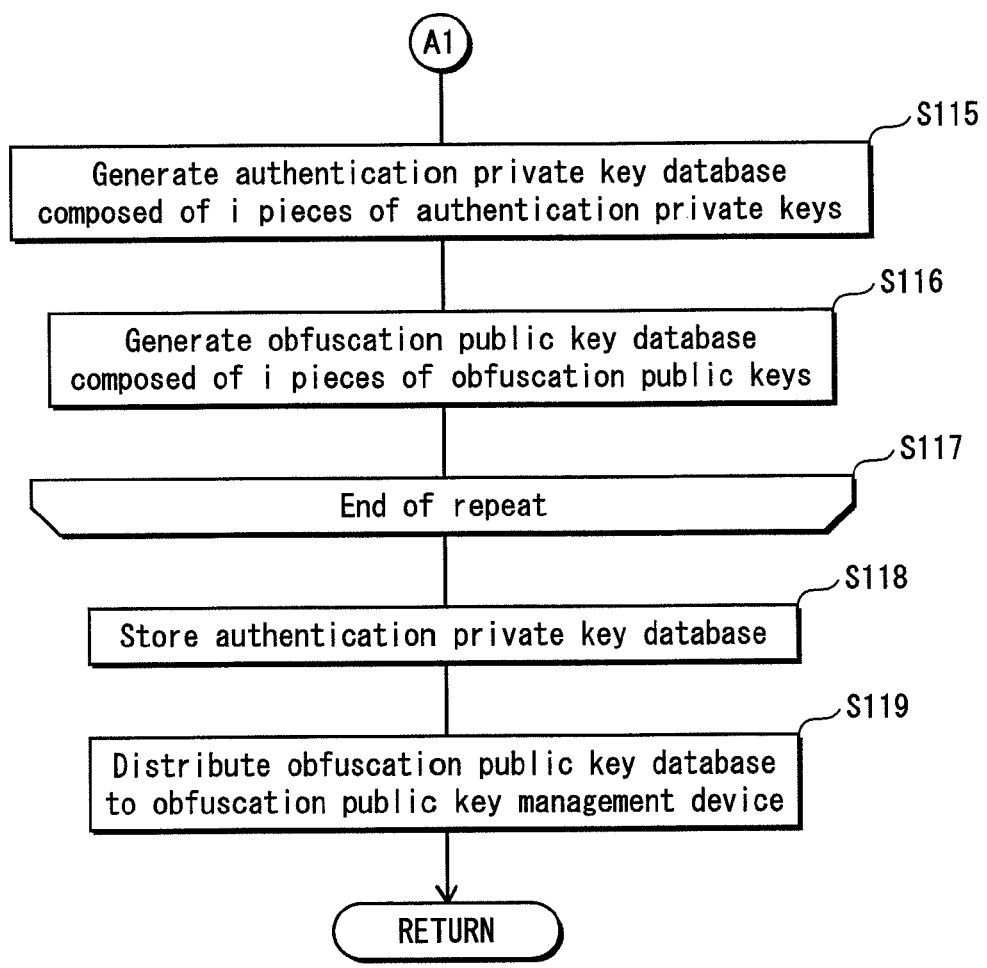
FIG. 16 is a flowchart showing the operation in the system setup process, continued from FIG. 15.

FIGS. 15 and 16 are flowcharts showing the operation in the system setup process performed by the authentication system 1, and are details of step S1 in the flowchart of FIG. 14. It should be noted here that, in the following description, the authentication device 10 is the subject performing the system setup process.

The signature key generating unit 101 of the authentication device 10 generates a signature generation key (step S101), and outputs the generated signature generation key to the identification authentication information generating unit 106. The identification authentication information generating unit 106 stores the signature generation key (step S102). The signature key generating unit 101 generates a signature verification key that corresponds to the signature generation key generated in step S101 (step S103), and notifies the service use device 20 of the generated signature verification key (step S104).

After this, the obfuscation public key generating unit 102 repeats the steps from S105 to S117, for each of age, nationality and address.

First, the obfuscation public key generating unit 102 sets "0" to "i" (step S106), and generates prime numbers p__1, q__1 randomly (step S107). After this, the obfuscation public key generating unit 102 calculates n__1=p__1×q__1, where "n__1" is the modulus in the RSA encryption (step S108).

The obfuscation public key generating unit 102 randomly generates d_i that satisfies 2≦d_i≦n_i−1, where "d_i" is a private key in the RSA encryption (step S109), and then calculates a public key in the RSA encryption that satisfies e_i×d_i=1 mod λ(n_i) (step S110).

Here, "λ(n_i)" is the Carmile function, and the value of the Carmile function "λ(n_i)" for "(n_i)" becomes the least common multiple between "p_i" and "q_i".

The obfuscation public key generating unit 102 sets "d_i", which is the private key in the RSA encryption generated in step S109, to the (i)th authentication private key for authenticating the (i)th (step S111). The obfuscation public key generating unit 102 sets (e_i,n_i), which is the public key pair calculated in step S110, to the (i)th obfuscation public key (step S112). Next, the obfuscation public key generating unit 102 sets "i+1" to "i" (step S113).

When generation of the authentication private key and the obfuscation public key has not ended for each of all values that the "i" can take (No in step S114), the obfuscation public key generating unit 102 returns to step S107 and continues the process. When generation of the authentication private key and the obfuscation public key has ended for each of all values that the "i" can take (Yes in step S114), the obfuscation public key generating unit 102 generates an authentication private key database composed of "i" pieces of authentication private keys (step S115). It is presumed here that the number—nation name correspondence table 120*a* (see FIG. 4) and the number—todofuken name correspondence table 130*a* (see FIG.

5) are generated at the same time as the generation of the authentication private key database.

Following this, the obfuscation public key generating unit 102 generates an obfuscation public key database composed of "i" pieces of obfuscation public keys (step S116). When generation of the authentication private key database and the obfuscation public key database has ended for each of age, nationality, and address (step S117), the obfuscation public key generating unit 102 outputs the age authentication private key database 110, nationality authentication private key database 120, and address authentication private key database 130 to the identification authentication private key holding unit 105. The identification authentication private key holding unit 105 stores each of the databases (step S118).

Next, the obfuscation public key generating unit 102 distributes the age obfuscation public key database 300, nationality obfuscation public key database, and address obfuscation public key database to the obfuscation public key management device 30 (step S119).

3. Operation in Identification Authentication Information Issuance Process

Figure 17:
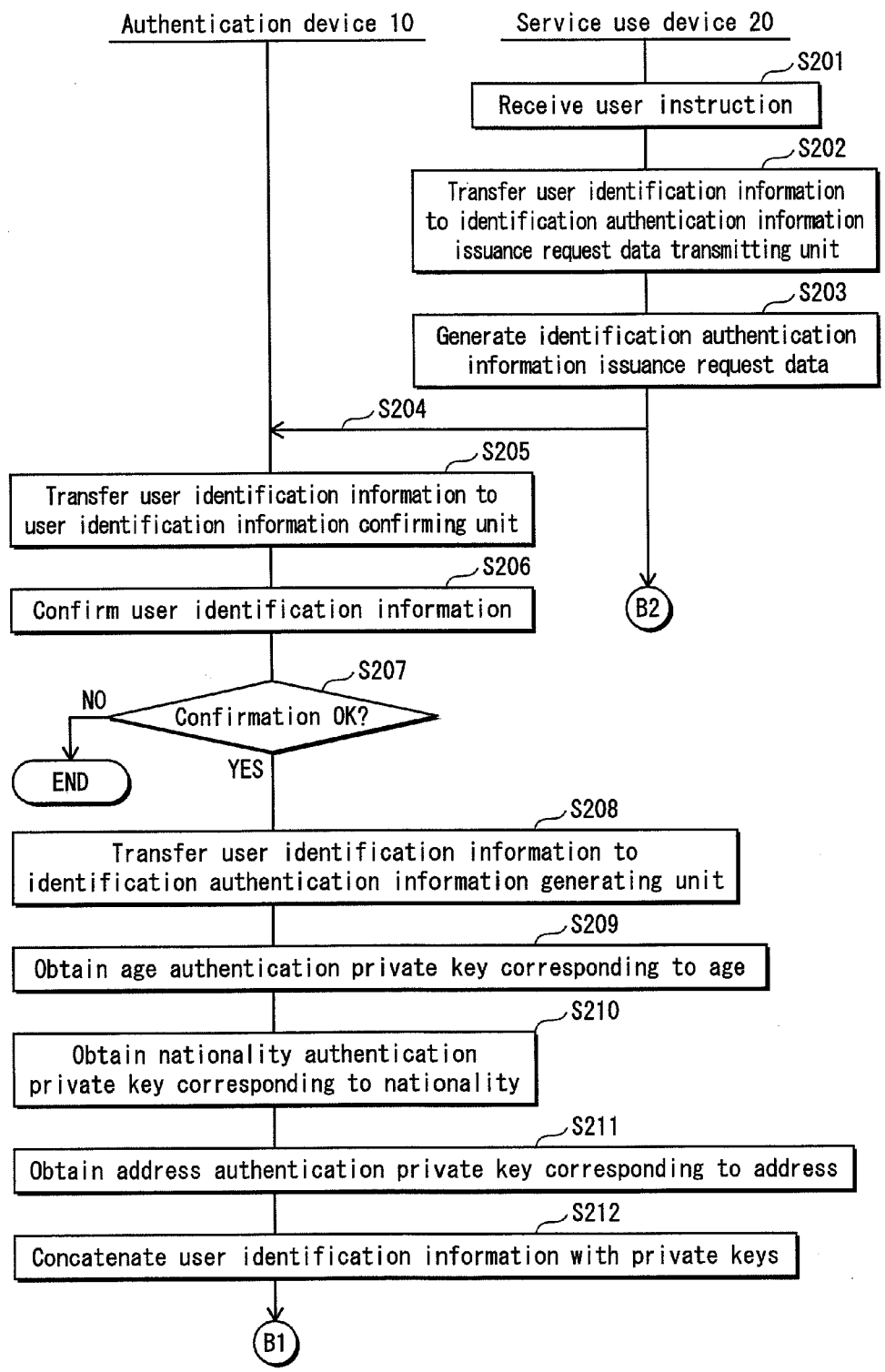
FIG. 17 is a flowchart showing the operation in the identification authentication information issuance process, continued to FIG. 18.
Figure 18:
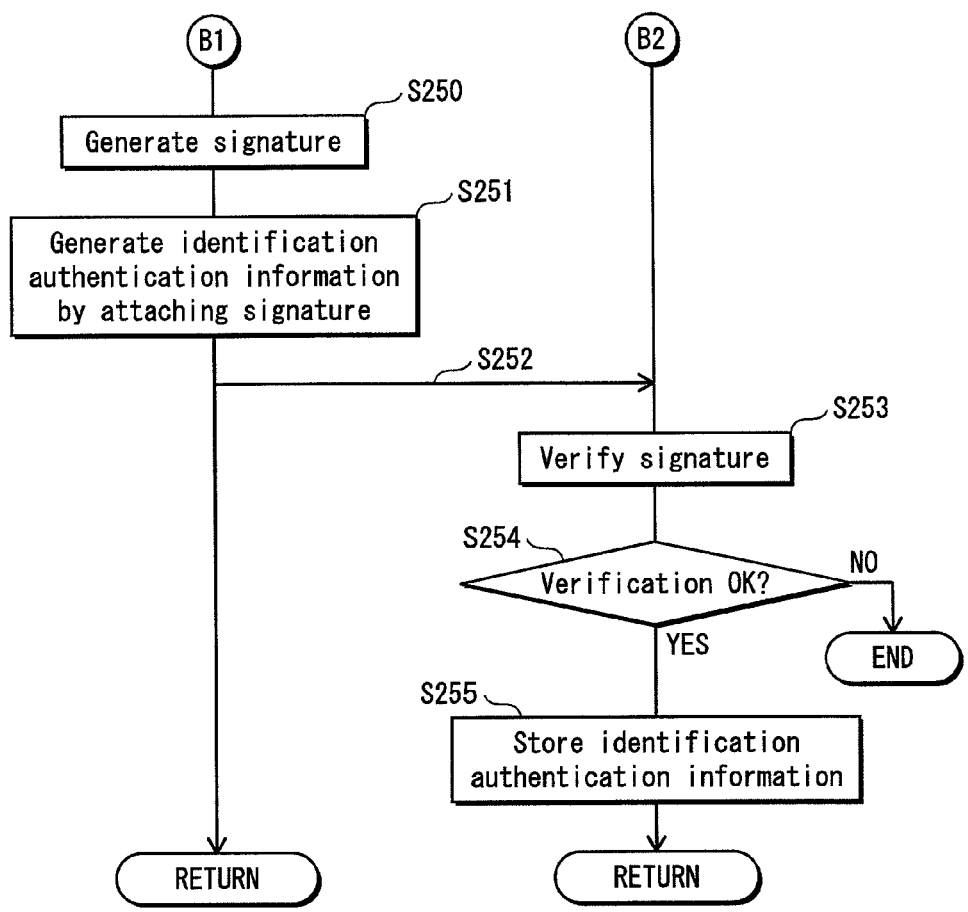
FIG. 18 is a flowchart showing the operation in the identification authentication information issuance process, continued from FIG. 17.

FIGS. 17 and 18 are flowcharts showing the operation in the identification authentication information issuance process performed by the authentication system 1, and are details of step S2 in the flowchart of FIG. 14.

First, upon receiving a user instruction, input by the user, for obtaining the identification authentication information (step S201), the service use device 20 transfers the user identification information 140, stored in the user identification information storage unit 201, to the identification authentication information issuance request data transmitting unit 202 (step S202).

The identification authentication information issuance request data transmitting unit 202 generates the identification authentication information issuance request data that contains the user identification information 140 (step S203). The identification authentication information issuance request data transmitting unit 202 transmits the identification authentication information issuance request data to the authentication device 10 via the network 60. The identification authentication information issuance request data receiving unit 103 of the authentication device 10 receives the identification authentication information issuance request data (step S204).

The identification authentication information issuance request data receiving unit 103 extracts the user identification information 140 from the received identification authentication information issuance request data, and transfers the extracted user identification information 140 to the user identification information confirming unit 104 (step S205). The user identification information confirming unit 104 confirms whether or not the received user identification information 140 is valid (step S206).

When the user identification information confirming unit 104 confirms that the received user identification information 140 is invalid (No in step S207), the authentication device 10 ends the identification authentication information issuance process. When the user identification information confirming unit 104 confirms that the received user identification information 140 is valid (Yes in step S207), the user identification information confirming unit 104 transfers the user identification information 140 to the data dividing unit 151 of the identification authentication information generating unit 106 (step S208).

The data dividing unit 151 divides the received user identification information 140 into the age information 141, nationality information 142, and address information 143, and outputs the divided information to the identification authentication private key obtaining unit 152 and the identification authentication private key attaching unit 153.

Next, the identification authentication private key obtaining unit 152 obtains the "age 24" authentication private key d_24 corresponding to the age information 141, from the age authentication private key database 110 stored in the identification authentication private key holding unit 105 (step S209), obtains the "USA" authentication private key d_50 corresponding to the nationality information 142, from the nationality authentication private key database 120 (step S210), and obtains the "Osaka" authentication private key d 23 corresponding to the address information 143, from the address authentication private key database 130 (step S211). The identification authentication private key obtaining unit 152 outputs the obtained three private keys to the identification authentication private key attaching unit 153.

Following this, the identification authentication private key attaching unit 153 generates the age authentication information 161 by concatenating the age information 141 with the "age 24" authentication private key d_24, generates the nationality authentication information 162 by concatenating the nationality information 142 with the "USA" authentication private key d_50, and generates the address authentication information 163 by concatenating the address information 143 with the "Osaka" authentication private key d_23 (step S212). The identification authentication private key attaching unit 153 outputs the age authentication information 161, nationality authentication information 162, and address authentication information 163 to the signature generating unit 154.

The signature generating unit 154 generates the authentication device signature data by attaching a digital signature to the age authentication information 161, nationality authentication information 162, and address authentication information 163, using the signature generation key (step S250). The identification authentication information generating unit 106 generates the identification authentication information 160 by adding the generated authentication device signature data to the age authentication information 161, nationality authentication information 162, and address authentication information 163 (step S251). The signature generating unit 154 outputs the generated identification authentication information 160 to the identification authentication information transmitting unit 107.

The identification authentication information transmitting unit 107 transmits the identification authentication information 160 to the service use device 20 via the network 60. The identification authentication information receiving unit 203 of the service use device 20 receives the identification authentication information 160 (step S252).

The identification authentication information receiving unit 203 outputs the received identification authentication information 160 to the signature verifying unit 204.

The signature verifying unit 204 verifies the received identification authentication information 160 using the signature verification key (step S253). When the result of the signature verification is a failure (No in step S254), the service use device 20 ends the process. When the result of the signature verification is a success (Yes in step S254), the signature verifying unit 204 outputs the identification authentication information 160 to the identification authentication information storage unit 205. The identification authentication information storage unit 205 stores the identification authentication information 160 (step S255).

4. Operation in Service Use Process

Figure 19:
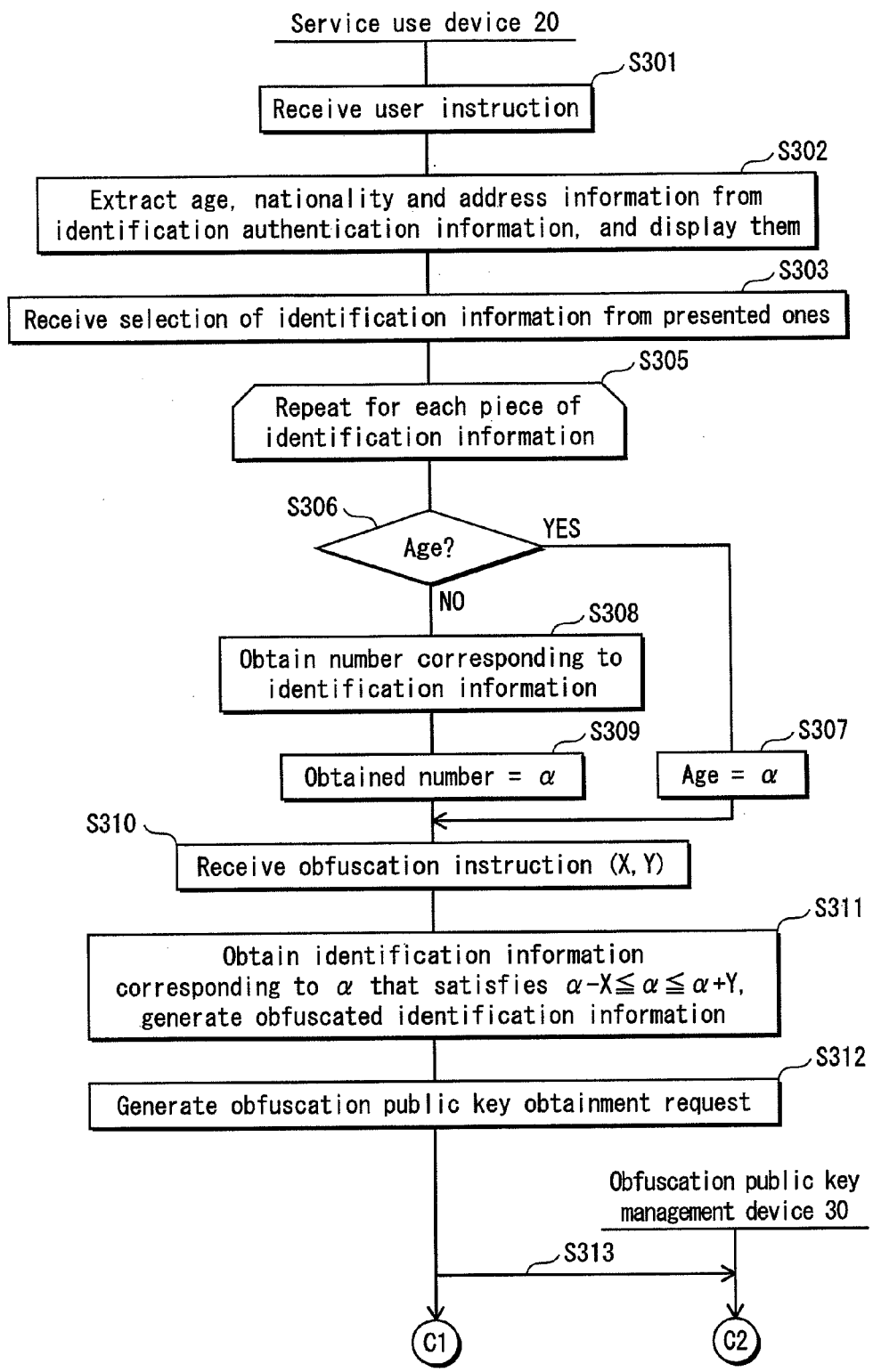
FIG. 19 is a flowchart showing the operation in the service use process, continued to FIG. 20.
Figure 20:
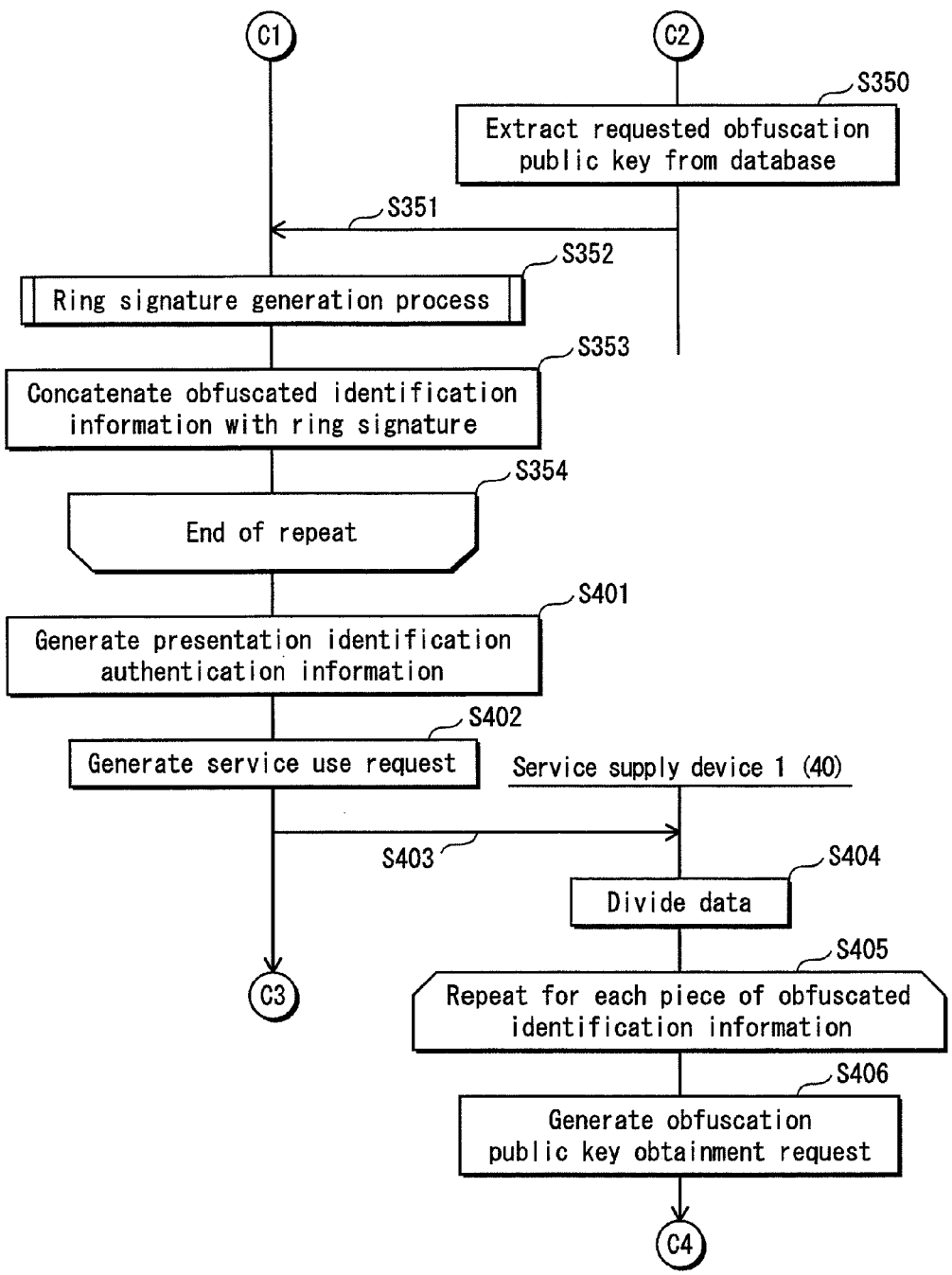
FIG. 20 is a flowchart showing the operation in the service use process, continued from FIG. 19, and continued to FIG. 21.
Figure 21:
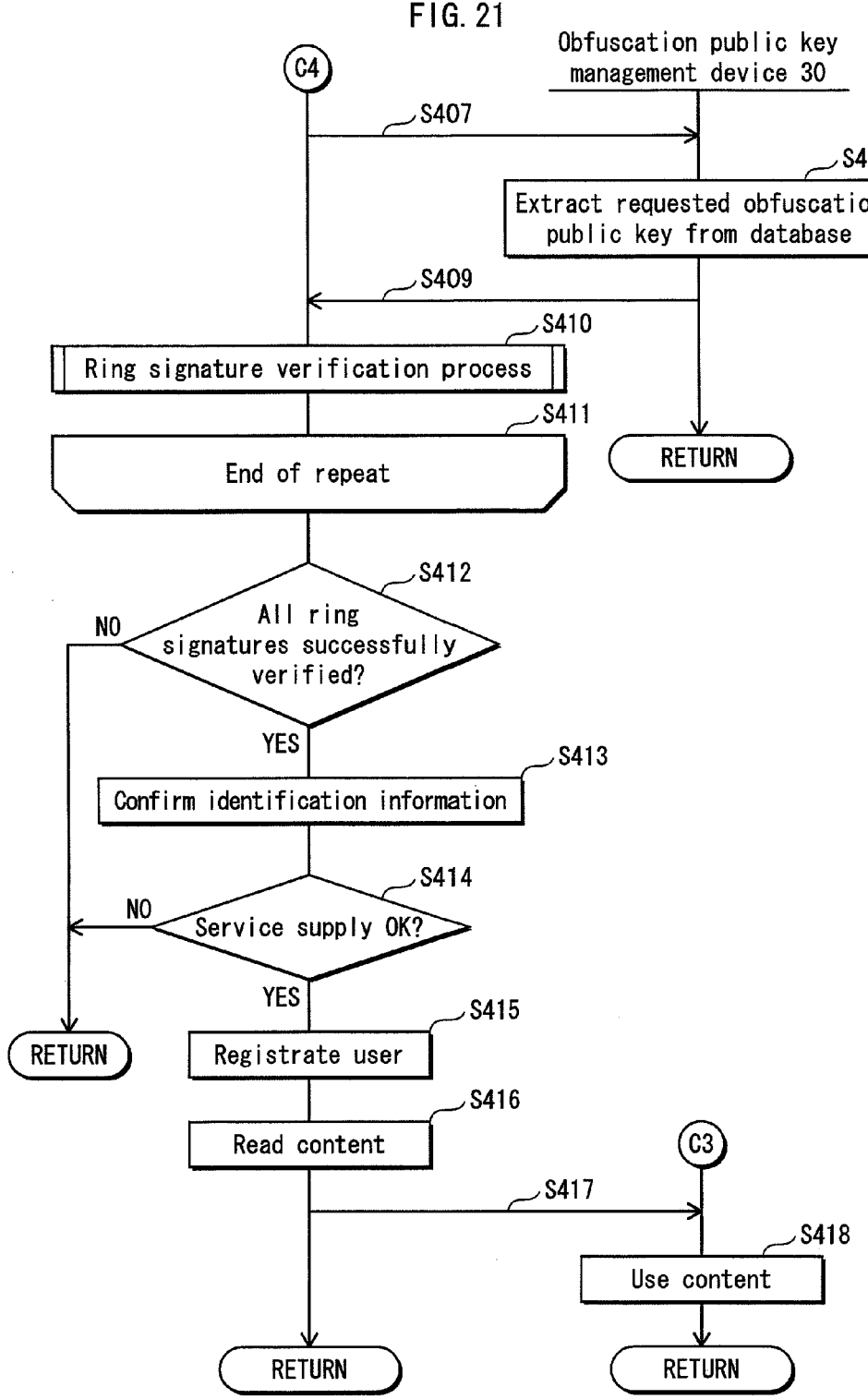
FIG. 21 is a flowchart showing the operation in the service use process, continued from FIG. 20.

FIGS. 19, 20, and 21 are flowcharts showing the operation in the service use process performed by the authentication system 1, and are details of step S3 in the flowchart of FIG. 14.

First, the service use device 20 receives a user instruction, input by the user, for using a service (step S301). It is presumed in the present example that the service use device 20 receives an instruction for sending a content use request to the service supply device 1 (40). This also applies to the operation of sending a content use request to the service supply device 2 (50).

The identification authentication information display unit 206 extracts the age information 161a, nationality information 162a, and address information 163a from the identification authentication information 160 stored in the identification authentication information storage unit 205, and display them on the display (step S302). The obfuscation instruction receiving unit 207 receives an indication, input by the user, of identification information to be presented to the service supply device 1 (40), that was selected from among the displayed information (step S303).

After this, the steps from S305 to S354 are repeated for each type of identification authentication information presented to the service supply device 1 (40).

First, when the identification authentication information to be presented is the age information 161a (Yes in step S306), the identification information converting unit 222 of the obfuscated identification authentication information generating unit 209 sets "age=age 24=a" (step S307).

When the identification authentication information to be presented is any of the nationality information 162a and address information 163a (No in step S306), the identification information converting unit 222 obtains a number corresponding to the identification information (step S308), and sets the obtained number to "α" (step S309).

More specifically, when the identification authentication information is the nationality information 162a, the identification information converting unit 222 obtains number "50" corresponding to the nationality "USA" from the number—nation name correspondence table 120a, and sets "α" to "50". When the identification authentication information is the address information 163a, the identification information converting unit 222 obtains number "23" corresponding to the address "Osaka" from the number—todofuken name correspondence table 130a, and sets "α" to "23".

Next, the obfuscation instruction receiving unit 207 receives obfuscation instruction (X,Y) being input (step S309), and outputs the received obfuscation instruction (X,Y) to the identification information converting unit 222.

Upon receiving the obfuscation instruction (X,Y), the identification information converting unit 222 generates obfuscated identification information (step S311). More specifically, the identification information converting unit 222 obtains identification information that corresponds to α that satisfies $\alpha - X \leq \alpha \leq \alpha + Y$, using the value of α having been set in step S307 or step S309 and the obfuscation instruction (X,Y), and generates the obfuscated identification information by concatenating all the obtained identification information. The identification information converting unit 222 outputs the generated obfuscated identification information to the ring signature generating unit 223 and the data concatenating unit 224.

Here, for example, when the identification authentication information to be presented is the age information 161a, and X and Y in the obfuscation instruction (X,Y) are respectively "0" and "3", the identification information converting unit 222 generates obfuscated age information "age=age 24, age 25, age 26, age 27" in step S311.

Upon receiving the obfuscated identification information, the ring signature generating unit 223 generates an obfuscation public key obtainment request that requests obfuscation public keys corresponding to each piece of identification information contained in the obfuscated identification information (step S312), and outputs the generated obfuscation public key obtainment request to the obfuscation public key obtaining unit 208.

The obfuscation public key obtaining unit 208 transmits the obfuscation public key obtainment request to the obfuscation public key management device 30 via the network 60. The obfuscation public key management device 30 receives the obfuscation public key obtainment request (step S313).

The obfuscation public key management device 30 extracts the requested obfuscation public key from the obfuscation public key database (step S350). The obfuscation public key management device 30 transmits the extracted obfuscation public key to the service use device 20 via the network 60. The obfuscation public key obtaining unit 208 of the service use device 20 receives the obfuscation public key (step S351).

The obfuscation public key obtaining unit 208 outputs the received obfuscation public key to the ring signature generating unit 223.

The ring signature generating unit 223 generates a ring signature (step S352), and outputs the generated ring signature to the data concatenating unit 224. The data concatenating unit 224 concatenates the obfuscated identification information with the ring signature (step S353).

When the process ends for all pieces of identification information (step S354), the data concatenating unit 224 generates the presentation identification authentication information (step S401). The data concatenating unit 224 outputs the generated presentation identification authentication information to the service use request transmitting unit 210.

Upon receiving the presentation identification authentication information, the service use request transmitting unit 210 generates a service use request containing the presentation identification authentication information, a content ID and the like (step S402). The service use request transmitting unit 210 transmits the generated service use request to the service supply device 1 (40) via the network 60. The data dividing unit 401 of the service supply device 1 (40) receives the service use request (step S403).

The data dividing unit 401 extracts the obfuscated identification information and ring signature from the presentation identification authentication information contained in the received service use request (step S404). The data dividing unit 401 outputs the obfuscated identification information to the authentication public key obtaining unit 402 and the user identification information confirming unit 404, and outputs the ring signature to the ring signature verifying unit 403.

Next, steps S405 to S411 are repeated for each piece of obfuscated identification information.

First, the authentication public key obtaining unit 402 generates an obfuscation public key obtainment request corresponding to the obfuscated identification information (step S406). For example, when the received obfuscated identification information is the obfuscated age information "age=age 24, age 25, age 26, age 27" 250a shown in FIG. 12A, the authentication public key obtaining unit 402 generates an obfuscation public key obtainment request requesting four obfuscation public keys which respectively correspond to age 24, age 25, age 26, and age 27.

The authentication public key obtaining unit 402 transmits the generated obfuscation public key obtainment request to the obfuscation public key management device 30 via the network 60. The obfuscation public key management device 30 receives the obfuscation public key obtainment request (step S407).

The obfuscation public key management device 30 extracts the requested obfuscation public key from the obfuscation public key database (step S408). The obfuscation public key management device 30 transmits the extracted obfuscation public key to the service supply device 1 (40) via the network 60. The authentication public key obtaining unit 402 of the service supply device 1 (40) receives the obfuscation public key (step S409). The authentication public key obtaining unit 402 outputs the received obfuscation public key to the ring signature verifying unit 403.

Next, the ring signature verifying unit 403 performs the ring signature verification process (step S410). After ending the process with respect to all pieces of obfuscated identification information (step S411), the service data transmission control unit 406 judges whether or not all ring signatures have been successfully verified. When any ring signature has not been successfully verified (No in step S412), the process is ended. When all ring signatures have been successfully verified (Yes in step S412), the user identification information confirming unit 404 confirms the obfuscated identification information received from the data dividing unit 401 (step S413), and judges whether or not the service can be supplied to the user (step S414). When it is judged that the service cannot be supplied to the user as a result of the confirmation of the obfuscated identification information (No in step S414), the process is ended. When it is judged that the service can be supplied to the user (Yes in step S414), the user registration unit 405 performs the user registration process (step S415).

When all the ring signatures have been successfully verified and it has been judged that the service can be supplied, the content transmitting unit 408 reads out a content from the content storage unit 407 (step S416).

The content transmitting unit 408 transmits the read-out content to the service use device 20 via the network 60. The content receiving unit 211 of the service use device 20 receives the content (step S417). The content receiving unit 211 outputs the received content to the content playback unit 212. The content playback unit 212 plays back the content (step S418).

5. Operation in Ring Signature Generation Process

Figure 22:
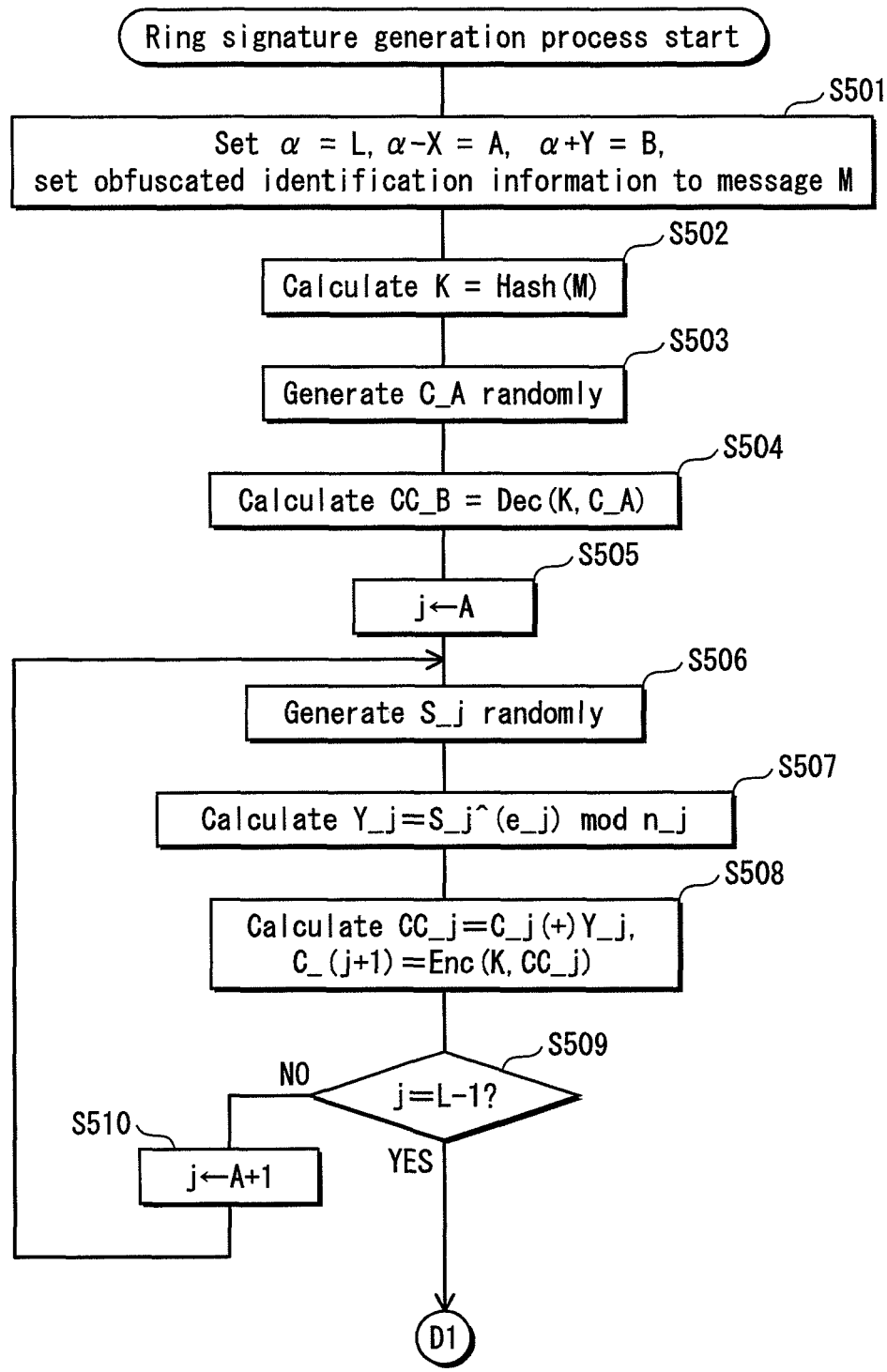
FIG. 22 is a flowchart showing the operation in the ring signature generation process, continued to FIG. 23.
Figure 23:
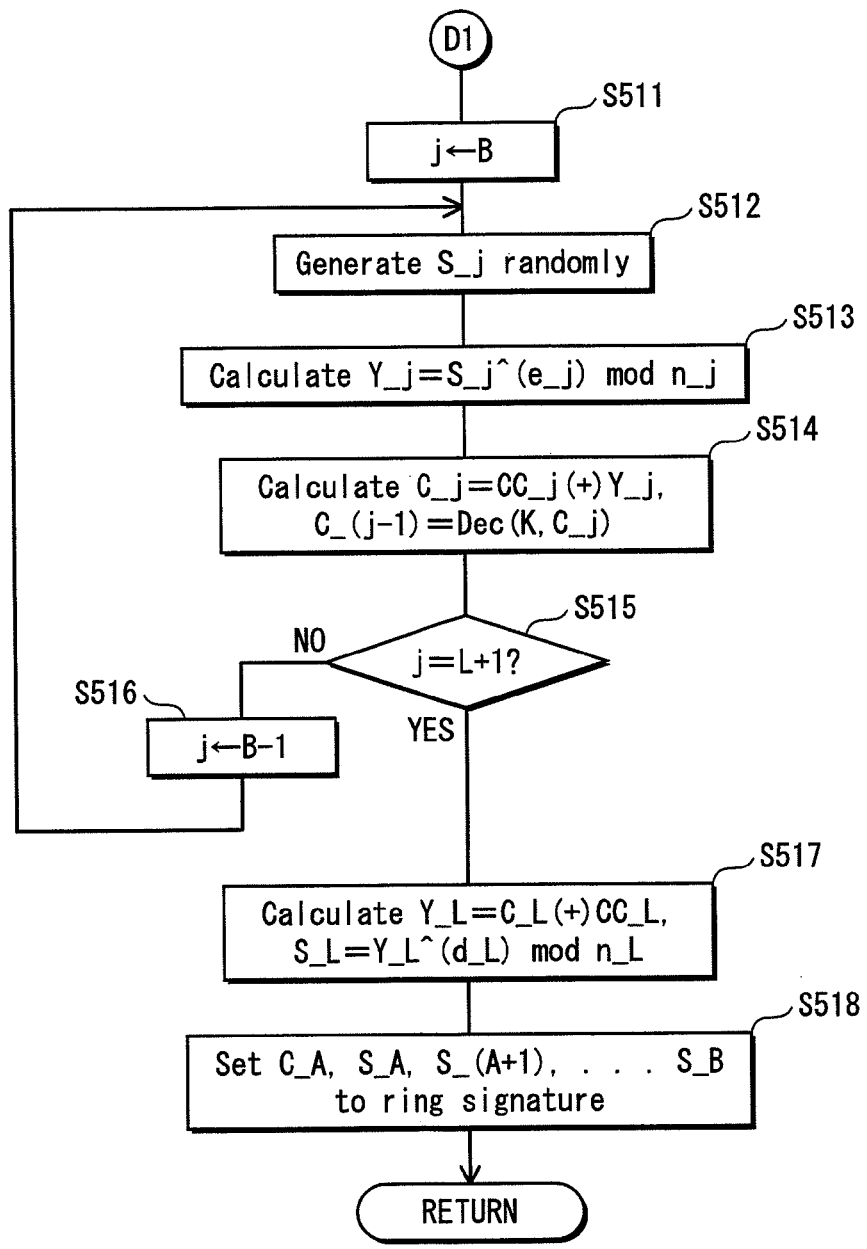
FIG. 23 is a flowchart showing the operation in the ring signature generation process, continued from FIG. 22.

FIGS. 22 and 23 are flowcharts showing the operation in the ring signature generation process performed by the ring signature generating unit 223, and are details of step S352 in the flowchart of FIG. 20.

It is presumed in the present example that each pair of public key and private key in the ring signature method is assigned with a sequential number starting with "0". In the present embodiment, the pairs of age authentication private key and age obfuscation public key are assigned with sequential numbers corresponding to age 0 to age 99. Also, the pairs of nationality authentication private key and nationality obfuscation public key are assigned with numbers as indicated in the number—nation name correspondence table 120a, and the pairs of address authentication private key and address obfuscation public key are assigned with numbers as indicated in the number—todofuken name correspondence table 130a.

The ring signature generating unit 223 sets $\alpha=L$, $\alpha-X=A$, $\alpha+Y=B$, and sets the obfuscated identification information to message M (step S501).

The ring signature generating unit 223 generates a ring signature for the message M in the following procedures by using private key d_L for number "L" that is in a range from number A to number B ($A \leq L \leq B$), and by using public key (e_i,n_i) ($A \leq i \leq B$ and $i \neq L$) for numbers other than number "L".

First, the ring signature generating unit 223 calculates K=Hash(M) (step S502). Here, "Hash(M)" indicates a result of a hash calculation that is common in the system and was determined for the message M when the system was set up.

Next, the ring signature generating unit 223 generates C_A randomly (step S503), and calculates CC_B=Dec(K,C_A) (step S504). Here, "Dec(K,C_A)" indicates a result of a decrypting process that was performed, using "K" as a key, onto data C_A by a private key encryption method that was determined when the system was set up.

Next, the ring signature generating unit 223 sets "j=A" (step S505), and repeats steps S506 to S508 for each of j=A, A+1, ... L−1.

The ring signature generating unit 223 generates S_j randomly (step S506), and calculates Y_j=S_j^(e_j)mod n_j (step S507). Here, $X\hat{}\alpha$ indicates $\alpha^{th}$ power of X.

Next, the ring signature generating unit 223 calculates CC_j=C_j(+)Y_j, C_(j+1)=Enc(K,CC_j) (step S508). Here, (+) indicates the logic operation EXCLUSIVE OR, and Enc (K,CC_j) indicates a result of encrypting data CC_j using K as the key, by a private key encryption method that was determined when the system was set up.

When j=L−1 (Yes in step S509), the control moves to step S511. When j≠L−1 (No in step S509), the ring signature generating unit 223 sets j=A+1, then returns to step S506 to continue the process.

Following this, the ring signature generating unit 223 sets j=B (step S511), and repeats steps S512 to S514 for each of j=B, B−1, ... L+1.

The ring signature generating unit 223 generates S_j randomly (step S512), and calculates Y_j=S_j^(e_j)mod n_j (step S513).

Next, the ring signature generating unit 223 calculates C_j=CC_j(+)Y_j, C_(j−1)=Dec(K,C_j) (step S514).

When j=L+1 (Yes in step S515), the control moves to step S517. When j≠L+1 (No in step S515), the ring signature generating unit 223 sets j=B−1, then returns to step S512 to continue the process.

Next, the ring signature generating unit 223 calculates Y_L=C_L(+)CC_L,S_L=Y_L^(d_L)mod n_L (step S517).

The ring signature generating unit 223 sets a set of data (C_A, S_A, S_(A+1), ... S_B), which was obtained as a result of the above calculation, to the ring signature (step S518).

<<Specific Example of Generating Ring Signature>>

The following will describe, as a specific example of the ring signature generation process, a procedure for generating a ring signature for the obfuscated age information "age=age 24, age 25, age 26, age 27" and generating an age authentication ring signature.

In the following, the message M indicates numeric data of "age 24, age 25, age 26, age 27", the public keys used are "age 24" obfuscation public key (e_24,n_24), "age 25" obfuscation public key (e_25,n_25), "age 26" obfuscation public key (e_26,n_26), and "age 27" obfuscation public key (e_27,n_27), and the private key used is "age 24" authentication private key d_24. The values in step S501 are L=24, A=24, and B=27.

The ring signature generating unit 223

(1) calculates K=Hash(M);

(2) generates C_24 randomly, and calculates CC_27=Dec (K,C_24);

(3) skips steps S505 to S510 because A=24, L=24;

(4) repeats the following calculations (4-1) and (4-2) for each of j=27, 26, 25;

(4-1) generates $S\_j$ randomly, and calculates $Y\_j=S\_j\hat{\;}(e\_j)$ mod $n\_j$;

(4-2) calculates $C\_j=CC\_j(+)Y\_j$, $C\_(j-1)$ Dec(K,C\_j); and (5) calculates $Y\_24=C\_24(+)$ CC\_24, $S\_24=Y\_24\hat{\;}(d\,24)$ mod n24.

The ring signature generating unit 223 transfers a set of data (C\_24, S\_24, S\_25, S26, S\_27), which was obtained as a result of the above calculation, to the data concatenating unit 224 as the ring signature.

6. Operation in Ring Signature Verification Process

Figure 24:
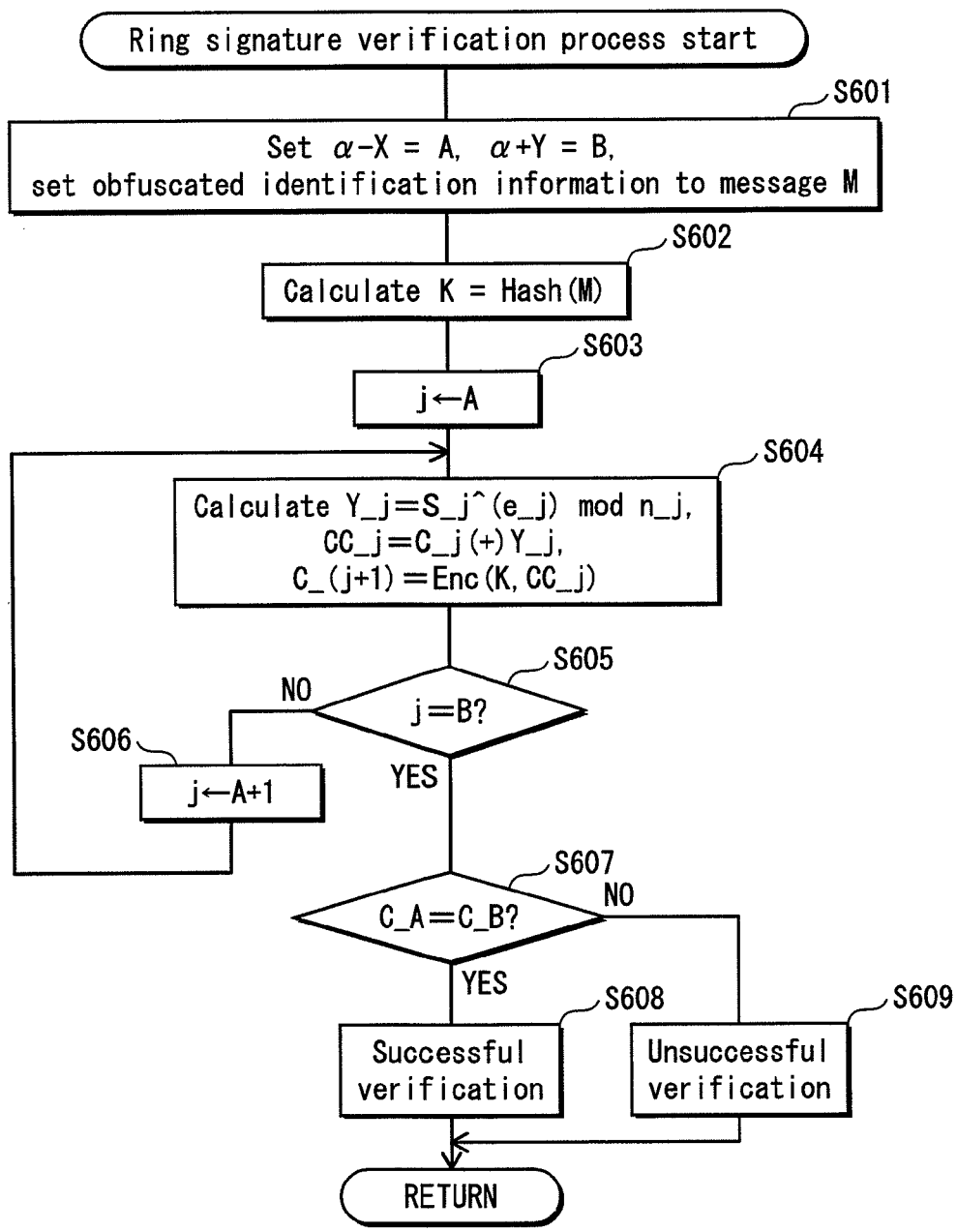
FIG. 24 is a flowchart showing the operation in the ring signature verification process.

FIG. 24 is a flowchart showing the operation in the ring signature verification process, and is a detail of step S410 in the flowchart of FIG. 21.

The ring signature verifying unit 403 sets α−X=A, α+Y=B, and sets the obfuscated identification information to the message M (step S601).

The ring signature verifying unit 403 calculates K=Hash (M) (step S602). Next, the ring signature verifying unit 403 sets j=A (step S603), and calculates $Y\_j=S\_j\hat{\;}(e\_j)$ mod $n\_j$, $CC\_j=C\_j(+)Y\_j$, $C\_(j+1)=Enc(K,CC\_j)$ (step S604).

When j=B (Yes in step S605), the control moves to step S607. When j≠B (No in step S605), the ring signature generating unit 223 sets j=A+1, then returns to step S604 to continue the process.

The ring signature verifying unit 403 judges whether C\_B=C\_A is satisfied. When C\_B=C\_A is satisfied (Yes in step S607), the ring signature verifying unit 403 judges that the ring signature is authentic (step S608); and when C\_B=C\_A is not satisfied (No in step S607), the ring signature verifying unit 403 judges that the ring signature is not authentic (step S609).

<<Specific Example of Ring Signature Verification>>

The following will describe, as a specific example of the ring signature verification process, a procedure for verifying a ring signature for the obfuscated age information "age=age 24, age 25, age 26, age 27".

In the following, the message M indicates numeric data of "age 24, age 25, age 26, age 27", and the values in step S601 are A=24 and B=27.

The ring signature verifying unit 403

(1) calculates K Hash(M);

(2) calculates $Y\_j=S\_j\hat{\;}(e\_j)$ mod $n\_j$, $CC\_j=C\_j(+)Y\_j$, $C\_(j+1)=Enc(K,CC\_j)$ for each of j=24, 25, 26, 27; and (3) judges that the ring signature is authentic when C\_27=C\_24 is satisfied, and judges that the ring signature is not authentic when C\_27=C\_24 is not satisfied.

<<Safety of Authentication System>>

Here, the following safety (1) and (2) in the authentication system 1 will be described.

Safety (1): The user identification information before obfuscation cannot be traced back from the obfuscated identification authentication information.

Safety (2): The obfuscated identification authentication information cannot be generated by obfuscating the identification authentication information in an unauthorized manner.

First, the above-mentioned safety (1) will be described. In the presentation identification authentication information 250 shown in FIG. 12A, the age information is subjected to the obfuscation process. The age authentication ring signature "C\_24, S\_24, S\_25, S\_26, S\_27" 250b indicates, by the nature of the ring signature, the signature was generated using an authentication private key of one of "age 24", "age 25", "age 26", "age 27", but does not indicate which private key was used to generate the signature. Therefore, as far as the ring signature satisfies the above-described function, the safety (1) is assured.

Next, the safety (2) will be described. By the nature of the ring signature, only a person having an authentication private key of one of "age 24", "age 25", "age 26", "age 27" (that is to say, a person of age 24, a person of age 25, a person of age 26, or a person of age 27) can generate the age authentication ring signature "C\_24, S\_24, S\_25, S\_26, S\_27" 250b. Therefore, as far as the used ring signature is safe, it is impossible for persons of other than ages 24 to 27 to forge the age authentication ring signature "C\_24, S\_24, S\_25, S\_26, S\_27" 250b. Namely, the safety (2) is also assured.

SUMMARY

As described above, the service use device 20 is a signature generating device for generating digital signature data that certifies authenticity of information of a person, and making the information obfuscated, the signature generating device comprising: a storage unit storing attribute information concerning the person and a private key corresponding to the attribute information; an obfuscated information generating unit operable to select one or more pieces of dummy information in relation to the attribute information, and generate the obfuscated information that includes the attribute information and the one or more pieces of dummy information; a public key obtaining unit operable to obtain a public key corresponding to the attribute information and one or more public keys respectively corresponding to the one or more pieces of dummy information; and a signature generating unit operable to generate digital signature data by performing a ring signature generation process to the obfuscated information, using (i) the private key corresponding to the attribute information, (ii) the public key corresponding to the attribute information, and (iii) the one or more public keys respectively corresponding to the one or more pieces of dummy information.

Also, the service supply device 1 (40) is a signature verifying device for verifying the digital signature data generated by the signature generating device, the signature verifying device comprising: a public key obtaining unit operable to obtain the public key corresponding to the attribute information and the one or more public keys respectively corresponding to the one or more pieces of dummy information; and a signature verifying unit operable to perform a ring signature verification process onto the digital signature data using the obtained public keys.

The service use device 20 in the present embodiment can generate the presentation identification authentication information by itself.

Suppose a system in which the authentication device 10 is requested to issue the presentation identification authentication information each time the service use device 20 transmits a service request to the service supply device 1 (40). There is a fear in such a system that, when requests for issuing the presentation identification authentication information are concentrated to the authentication device 10, the issuances may be delayed, or even the system may go down due to excessive processing load. Further, the system may be subjected to an attack by some malicious users in league of sending an enormous number of issuance requests to the authentication device 10 to cause a system down. When such a thing happens the authentication device 10 cannot provide the service in a stable manner.

In contrast, as described above, the service use device 20 in the present embodiment can generate the presentation identification authentication information by itself. This eliminates the need for requesting the authentication device 10 to issue the presentation identification authentication information. Accordingly, the authentication device 10 does not have concentrated processing loads and a stable system is achieved.

<Other Modifications>

The present invention, which has been described through an embodiment up to now, is not limited to the embodiment, but includes, for example, the following modifications as well.

(1) In the above-described embodiment, the service supplied by the service supply device 1 (40) and the service supply device 2 (50) to the service use device 20 is a content distribution service. However, the service to which the present invention can be applied is not limited to the content distribution service.

(2) The hash, encryption, and ring signature methods used in the present invention are not limited to the specific methods disclosed in the embodiment.

(3) In the above-described embodiment, three types of information (age, nationality, and address information) are used as the user identification information. However, the user identification information is not limited to these three types of information.

(4) In the above-described embodiment, when the service use device 20 discloses the identification information to the service supply device 1 (40) or the service supply device 2 (50), all the identification information should be subjected to the obfuscation process. The present invention is not limited to this structure. For example, the present invention includes a case where presentation identification information is generated by adding identification information, which has not been subjected to the obfuscation process, to the obfuscated identification information, and the generated presentation identification information is presented to each service supply device. In the following, a specific example thereof will be described.

The identification authentication information display unit 206 generates an obfuscation process selection screen that includes a message "Please select information to be subjected to the obfuscation process", as well as the extracted age information (age=age 24) 161*a*, nationality information (nationality=USA) 162*a*, and address information (address=Osaka) 163*a*. The identification authentication information display unit 206 displays the generated obfuscation process selection screen on the display.

After the information to be subjected to the obfuscation process is selected via the obfuscation instruction receiving unit 207, the identification authentication information display unit 206 generates an obfuscation instruction receiving screen that queries the user what obfuscation process the selected information should be subjected to. The identification authentication information display unit 206 displays the generated obfuscation instruction receiving screen on the display.

The obfuscation instruction receiving unit 207 prestores therein the number—nation name correspondence table 120*a* (see FIG. 4) and the number—todofuken name correspondence table 130*a* (see FIG. 5).

While the obfuscation process selection screen is displayed on the identification authentication information display unit 206, the obfuscation instruction receiving unit 207 receives, from the user via an input device such as the keyboard or mouse, an indication of identification information which should be subjected to the obfuscation process, that was selected from among the age information (age=age 24) 161*a*, nationality information (nationality=USA) 162*a*, and address information (address=Osaka) 163*a*. Here, only one piece or a plurality of pieces of identification information can be selected.

There may be a case where the user can freely specify identification information that should be subjected to the obfuscation process, or there may be a case where the user is restricted in specifying the identification information that should be subjected to the obfuscation process, in accordance with, for example, the service to use, or the type of the content to view. For example, when the user requests a service or a content that requires the exact age information of the user, the user is restricted from specifying the age information 161*a* as the identification information that should be subjected to the obfuscation process.

(5) In the above-described embodiment, the user identification information confirming unit 404 of the service supply device 1 (40) may prestore therein a table that shows correspondence between contents and ages of users to whom the contents can be supplied, and it may be judged whether the requested content can be supplied to the service use device 20, by referring to the table. Similarly, the service supply device 2 (50) may prestore therein a table that shows correspondence between contents and conditions (age, address or the like) of users to whom the contents can be supplied, and it may be judged whether the requested content can be supplied to the service use device 20, by referring to the table.

(6) In the above-described Embodiment, part or all of the functional blocks constituting the authentication device 10, part or all of the functional blocks constituting the service use device 20, and part or all of the functional blocks constituting the service supply device 1 (40) may be achieved as an LSI being an integrated circuit.

Each of the functional blocks may be achieved separately in one chip, or part or all of the functional blocks may be achieved in one chip. It should be noted here that although the term LSI is used here to indicate an integrated circuit for controlling the program retrieval device, the integrated circuit may be called IC, system LSI, super LSI, ultra LSI or the like, depending on the level of integration. Also, the integrated circuit is not limited to the LSI, but may be achieved by a dedicated circuit or a general purpose processor. It is also possible to achieve the integrated circuit by using the FPGA (Field Programmable Gate Array) that can be re-programmed after the LSI is manufactured, or a reconfigurable processor that can reconfigure the connection and settings of the circuit cells inside the LSI. Furthermore, a technology for an integrated circuit that replaces the LSI may appear in the near future as the semiconductor technology improves or branches into another technologies. In that case, the new technology may be incorporated into the integration of the functional blocks constituting the present invention as described above. Such possible technologies include biotechnology.

(7) The present invention may be methods shown by the above. The present invention may be a computer program that allows a computer to realize the methods.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the computer program or the digital signal recorded on any of the aforementioned recording medium apparatuses.

(8) The present invention may be any combination of the above-described embodiments and modifications.

INDUSTRIAL APPLICABILITY

The present invention can be used as a system in the industry of supplying contents to users, where the user side can use the system to disclose minimum personal information, and the content supplier side can use the system to confirm the authenticity of the users. The present invention can also be used in the industry of manufacturing and selling devices that receive supplied contents and use the contents.

The invention claimed is:

1. A signature generating device for generating digital ring signature data that certifies authenticity of information of a person, and for generating obfuscated information by obfuscating the information of the person, the signature generating device comprising:

a storage unit storing attribute information concerning the person and storing a private key corresponding to the attribute information, the attribute information holding a value and being identified according to a specific concept;

an obfuscated information generating circuit operable to (i) select one or more pieces of dummy information, the one or more pieces of selected dummy information being identified by the same specific concept as the attribute information and holding one or more values that are different from the value held by the attribute information, and (ii) generate the obfuscated information that includes the attribute information and the one or more pieces of selected dummy information, each of the one or more pieces of selected dummy information being for obfuscating the attribute information and being unrelated to the person;

a public key obtaining circuit operable to obtain a public key corresponding to the attribute information and operable to obtain one or more public keys respectively corresponding to the one or more pieces of selected dummy information;

a signature generating circuit operable to generate the digital ring signature data by performing a ring signature generation process on the obfuscated information, using (i) the private key corresponding to the attribute information, (ii) the public key corresponding to the attribute information, (iii) the one or more public keys respectively corresponding to the one or more pieces of selected dummy information, and (iv) a hash of the obfuscated information; and a presenting circuit operable to present authentication information to an external service supply device, the authentication information including the obfuscated information and the digital ring signature data and being for obfuscating the attribute information and for certifying that the attribute information of the person is included in a range that includes the one or more pieces of selected dummy information, wherein the signature generating device further comprises an obfuscation instruction receiving circuit operable to receive an obfuscation instruction indicating a selection condition for selecting dummy information, wherein the one or more pieces of selected dummy information satisfy the selection condition indicated by the obfuscation instruction, wherein the selection condition received by the obfuscation instruction receiving circuit indicates a number of pieces of dummy information to be selected, and wherein a number of pieces of dummy information selected by the obfuscated information generating circuit equals the number of pieces indicated by the selection condition.

* * * * *